US010389417B2

(12) United States Patent
Qian et al.

(10) Patent No.: US 10,389,417 B2
(45) Date of Patent: Aug. 20, 2019

(54) DEVICE AND METHOD FOR WIRELESS COMMUNICATIONS

(71) Applicant: SONY CORPORATION, Tokyo (JP)

(72) Inventors: Chen Qian, Beijing (CN); Zhaocheng Wang, Beijing (CN); Xudong Zhu, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/513,875

(22) PCT Filed: Oct. 28, 2015

(86) PCT No.: PCT/CN2015/093075
§ 371 (c)(1),
(2) Date: Mar. 23, 2017

(87) PCT Pub. No.: WO2016/066098
PCT Pub. Date: May 6, 2016

(65) Prior Publication Data
US 2017/0288750 A1 Oct. 5, 2017

(30) Foreign Application Priority Data
Oct. 31, 2014 (CN) .......................... 2014 1 0601798

(51) Int. Cl.
H04B 7/0456 (2017.01)
H04W 72/04 (2009.01)
(Continued)

(52) U.S. Cl.
CPC ......... *H04B 7/0456* (2013.01); *H04L 5/0048* (2013.01); *H04L 25/0204* (2013.01);
(Continued)

(58) Field of Classification Search
CPC . H04L 7/0456; H04L 5/0048; H04L 25/0204; H04L 25/0224; H04W 28/048;
(Continued)

(56) References Cited

U.S. PATENT DOCUMENTS 8,095,134 B2    1/2012  Huang et al.
8,774,307 B2    7/2014  Kim et al.
(Continued)

FOREIGN PATENT DOCUMENTS

CN    101668295 A    3/2010
CN    101753170 A    6/2010
(Continued)

OTHER PUBLICATIONS

International Search Report dated Jan. 27, 2016, in PCT/CN2015/093075 filed Oct. 28, 2015.
(Continued)

*Primary Examiner* — Syed Haider
(74) *Attorney, Agent, or Firm* — Xsensus LLP

(57) ABSTRACT

A device and method for wireless communications. The device includes: an information acquisition unit, configured to acquire channel information about a transmission object and a non-transmission object for wireless communications, wherein the transmission of the transmission object is controlled by the device and transmission of the non-transmission object is not controlled by the device; and an interference reducing unit, configured to reduce interference with the non-transmission object based on the channel information about the transmission object and the non-transmission object.

22 Claims, 12 Drawing Sheets

(51) Int. Cl.
*H04W 28/04* (2009.01)
*H04L 5/00* (2006.01)
*H04L 25/02* (2006.01)

(52) U.S. Cl.
CPC ......... *H04L 25/0224* (2013.01); *H04W 28/04* (2013.01); *H04W 72/04* (2013.01); *Y02D 70/00* (2018.01); *Y02D 70/122* (2018.01); *Y02D 70/1262* (2018.01); *Y02D 70/1264* (2018.01); *Y02D 70/26* (2018.01)

(58) Field of Classification Search
CPC ...... H04W 72/04; H04W 28/04; Y02D 70/00; Y02D 70/1264; Y02D 70/26; Y02D 70/122; Y02D 70/1262; H04B 7/0456
See application file for complete search history.

(56) References Cited

U.S. PATENT DOCUMENTS

| | | | |
|---|---|---|---|
| 2007/0155336 A1 | 7/2007 | Nam et al. | |
| 2010/0035627 A1 | 2/2010 | Hou et al. | |
| 2010/0099428 A1* | 4/2010 | Bhushan | H04J 11/0059 455/452.1 |
| 2010/0203912 A1* | 8/2010 | Ashikhmin | H04B 7/0434 455/501 |
| 2011/0275397 A1 | 11/2011 | Guey et al. | |
| 2011/0280162 A1* | 11/2011 | Ashikhmin | H04B 7/0617 370/280 |
| 2012/0063344 A1 | 3/2012 | Ohm et al. | |
| 2013/0078991 A1* | 3/2013 | Nam | H04B 7/024 455/423 |
| 2015/0009852 A1* | 1/2015 | Chen | H04B 7/024 370/252 |
| 2015/0215016 A1* | 7/2015 | Hunukumbure | H04L 5/0023 370/280 |

FOREIGN PATENT DOCUMENTS

| | | |
|---|---|---|
| CN | 101925185 A | 12/2010 |
| EP | 2 642 786 A1 | 9/2013 |
| WO | WO 2008/050230 A2 | 5/2008 |
| WO | WO 2009/157723 A1 | 12/2009 |

OTHER PUBLICATIONS

Nagaraj, S., et al., "Coordinated Beamforming in Clustered HetNets: System Design and Performance Evaluation", IEEE WCNC 2014—Workshop on Interference and Design Issues for Future Heterogeneous Networks, pp. 70-75, (Apr. 6, 2014).

Lee, T., et al., Sounding Resource Management for QoS Support in Massive MIMO Systems, Computer Networks, vol. 70, pp. 142-153, (May 9, 2014).

* cited by examiner

DEVICE AND METHOD FOR WIRELESS COMMUNICATIONS

FIELD OF THE INVENTION

The embodiments of the present disclosure generally relate to the technical field of wireless communications, and in particular to an apparatus and a method for wireless communications. More specifically, the embodiments of the present disclosure relate to a pilot allocation and pre-coding technology in a large-scale multi-input multi-output (MIMO) communication system.

BACKGROUND OF THE INVENTION

Large scale MIMO systems have been widely focused by both the academia and the industry in recent years. Theoretical studies have demonstrated that, both spectral efficiency and energy efficiency of the large-scale MIMO system can be significantly improved by using simple liner algorithms such as a zero-forcing algorithm, a minimum mean square error algorithm and the like. Therefore, the large-scale MIMO system is likely to be adopted as a key technology in next generation communication standards.

However, the system performance of the large-scale MIMO system is limited by pilot pollution problem in a scenario of, for example, multi-cell time-division multiplexing. Specifically, since the length of the pilot is limited by a coherence length of a channel, the number of orthogonal pilots is limited, and the pilots are inevitably shared among different cells. In this case, pilot signals transmitted by user equipments in different cells using the same pilot sequences may be received by a same base station, which, however, cannot effectively distinguish the pilot signals from each other, thereby resulting in interferences to channel estimation at the base station. When performing uplink data detection using the interfered channel estimation, the base station may receive data from user equipments in other cells, besides data transmitted by user equipments in the cell where the base station is located, thereby resulting in inter-cell interferences in the uplink. When the base station generates a pre-coding matrix and transmits down-link data using the interfered channel estimation, besides the user equipments in the cell where the base station is located, user equipments in other cells may also receive the data, thereby resulting in inter-cell interferences in the downlink.

Theoretical studies have demonstrated that, although both spectral efficiency and energy efficiency of the large-scale MIMO system can be significantly improved, and the influences of noises and channel estimation errors on the system performance are reduced as the number of antennas of the base station is increased, the inter-cell interferences caused by the pilot pollution cannot be eliminated and become one of the factors limiting the performance of the large-scale MIMO system.

In addition, conventional methods for alleviating the pilot pollution are often difficult to be adapted to current technical conditions. Therefore, in actual applications, the pilot pollution is still one of the most serious problems confronted by the large-scale MIMO system.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus for wireless communications is provided, including: an information acquiring unit, configured to acquire channel information for transmission objects and non-transmission objects of wireless communications, wherein transmission by the transmission objects is controlled by the apparatus and transmission by the non-transmission objects is not controlled by the apparatus; and an interference alleviating unit, configured to alleviate, based on the channel information for the transmission objects and the non-transmission objects, interferences to the non-transmission objects.

According to an aspect of the present disclosure, a wireless communication method is further provided, including: acquiring channel information for transmission objects and non-transmission objects of wireless communications, wherein transmission by the transmission objects is controlled by a given apparatus and transmission by the non-transmission objects is not controlled by the given apparatus; and alleviating, based on the channel information for the transmission objects and the non-transmission objects, interferences to the non-transmission objects.

With the above device and the above method, the interferences to the non-transmission objects can be significantly reduced by considering the channel information for both the transmission objects and the non-transmission objects.

According to another aspect of the present disclosure, an apparatus for use in a wireless communication system is provided, including: a first grouping unit, configured to divide pilot sequences for wireless communications into a cell center pilot group to be used for communication devices in a center of a cell and a cell edge pilot group to be used for communication devices in an edge of the cell; a second grouping unit, configured to divide the cell edge pilot group into a plurality of cell edge pilot sub-groups which do not overlap with each other; and a pilot sub-group allocating unit, configured to allocate different cell edge pilot sub-groups to neighboring cells, wherein pilot sequences contained in the cell center pilot group are multiplexed by neighboring cells.

According to another aspect of the present disclosure, a method for use in a wireless communication system is further provided, including: dividing pilot sequences for wireless communications into a cell center pilot group to be used for communication devices in a center of a cell and a cell edge pilot group to be used for communication devices in an edge of the cell; dividing the cell edge pilot group into a plurality of cell edge pilot sub-groups which do not overlap with each other; and allocating different cell edge pilot sub-groups to neighboring cells, wherein pilot sequences contained in the cell center pilot group are multiplexed by neighboring cells.

With the above device and the above method, the pilot pollution can be more effectively alleviated by dividing the pilot sequences into the cell center pilot group and the cell edge pilot group.

According to an aspect of the present disclosure, an apparatus for wireless communications is provided, including: a classifying unit, configured to classify communication devices in a cell into cell center communication devices and cell edge communication devices; and an allocating unit, configured to allocate at least part of pilot sequences in a cell center pilot group to the cell center communication devices, and allocate at least part of pilot sequences in a cell edge pilot group to the cell edge communication devices, wherein the apparatus and neighboring cells multiplex the cell center pilot group, and the apparatus and the neighboring cells do not multiplex the at least part of pilot sequences in the cell edge pilot group.

According to another aspect of the present disclosure, a method for wireless communications is further provided, including: classifying communication devices in a cell into cell center communication devices and cell edge communication devices; and allocating at least part of pilot sequences in a cell center pilot group to the cell center communication devices, and allocating at least part of pilot sequences in a cell edge pilot group to the cell edge communication devices, wherein the cell and neighboring cells multiplex the cell center pilot group, and the cell and the neighboring cells do not multiplex the at least part of pilot sequences in the cell edge pilot group.

With the above device and the above method, the communication devices in a cell are classified into the cell center communication devices and the cell edge communication devices, and pilot sequences in different pilot groups are allocated to the cell center communication devices and the cell edge communication devices. Thus, the interferences from the communication devices in the cell where the base station is located to the communication devices in a neighboring cell can be effectively avoided, thereby alleviating the pilot pollution.

According to another aspect of the present disclosure, an apparatus for wireless communications is further provided, including: an interference parameter determining unit, configured to determine parameters related to interferences to non-transmission objects; and a range determining unit, configured to determine, based on the parameters, a range of non-transmission objects to which the interferences are to be considered, wherein transmission by transmission objects of the apparatus is controlled by the apparatus and transmission by the non-transmission objects is not controlled by the apparatus.

According to yet another aspect of the present disclosure, a method for wireless communications is further provided, including: determining parameters related to interferences to non-transmission objects; and determining, based on the parameters, a range of non-transmission objects to which the interferences are to be considered, wherein transmission by transmission objects of a given apparatus is controlled by the given apparatus and transmission by the non-transmission objects is not controlled by the given apparatus.

With the above device and the above method, the range of the non-transmission objects to which the interferences are to be considered is determined based on the related parameters, thus the non-transmission objects which are susceptible to interferences from the transmission objects of the apparatus may be determined more accurately by taking various factors into consideration.

According to other aspects of the present disclosure, there are also provided computer program codes and computer program products for implementing the above mentioned methods for wireless communications and a computer readable storage medium in which computer program codes for implementing the above method for wireless communications are recorded.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<First Embodiment>

Figure 1:
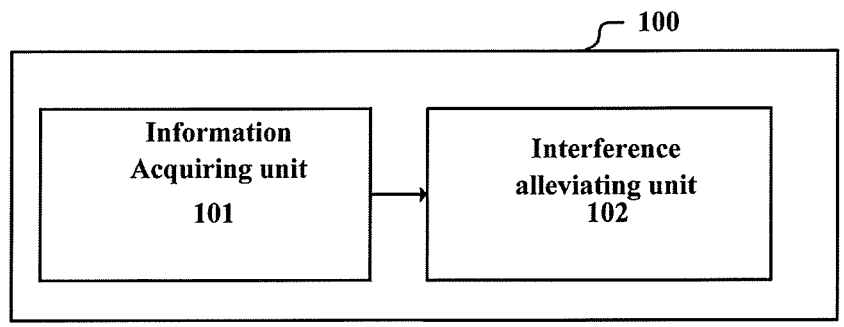
FIG. 1 is a block diagram illustrating a structure of an apparatus for wireless communications according to an embodiment of the present disclosure.

FIG. 1 illustrates a block diagram of a structure of an apparatus 100 for wireless communications according to an embodiment of the present disclosure. The apparatus 100 includes: an information acquiring unit 101, configured to acquire channel information for transmission objects and non-transmission objects of wireless communications, where transmission by the transmission objects is controlled by the apparatus 100 and transmission by the non-transmission objects is not controlled by the apparatus 100; and an interference alleviating unit 102, configured to alleviate, based on the channel information for the transmission objects and the non-transmission objects, interferences to the non-transmission objects.

For example, in cellular mobile communications, the apparatus 100 may be a base station device, the transmission objects are user equipments in a cell where the apparatus 100 is located, and the non-transmission objects are user equipments in a cell served by another base station device. In other words, the non-transmission objects are not user equipments in the cell where the apparatus 100 is located, thus they are also referred to as, for example, unexpected nodes or a non-serving target nodes in the present disclosure. In this case, when the interferences from the downlink transmission performed by the apparatus 100 to user equipments in other cells are alleviated by the interference alleviating unit 102, not only influences of the channel information for the user equipments in the cell where the apparatus 100 is located but also influences of the channel information for the user equipments in other cells are considered. Further, in some examples of the present disclosure, the apparatus 100 is a macro base station device, and the transmission objects are other infrastructures such as small cell base station devices in the cell where the apparatus 100 is located, where the apparatus 100 wirelessly communicates with the small cell base station devices. Correspondingly, the non-transmission objects may be small cell base station devices within the coverage of other macro cells.

In addition, while an example where the apparatus 100 is a base station device is shown herein, the present disclosure is not limited thereto. For example, the apparatus 100 may also be a base-band cloud device under a C-RAN (Cloud-RAN/Centralized-RAN) structure (in which there may be no such a concept as a cell), such as any BBU in BBU pools connected in high-speed connections with each other under the C-RAN architecture.

As described above, the information acquiring unit 101 acquires the channel information for the transmission objects and the non-transmission objects. In an example, the information acquiring unit 101 is configured to receive pilot signals transmitted by the transmission objects and pilot signals transmitted by the non-transmission objects, and perform channel estimation based on the pilot signals to obtain the channel information, where pilot sequences carried by the pilot signals transmitted by the transmission objects are orthogonal to pilot sequences carried by the pilot signals transmitted by the non-transmission objects. It should be understood that, the pilot sequences carried by the pilot signals transmitted by the transmission objects being orthogonal to pilot sequences carried by the pilot signals transmitted by the non-transmission objects is a preferred example of the present disclosure, so that the apparatus 100 can distinguish the transmission objects from the non-transmission objects accurately and rapidly, and estimate corresponding channel information. In other examples, the pilot sequences of the transmission objects may be not exactly orthogonal to pilot sequences of the non-transmission objects, and the apparatus 100 may distinguish the transmission objects from the non-transmission objects according to related information of the transmission objects and the non-transmission objects such as groups to which the pilots belong and geographical locations thereof, which is known in advance.

For example, in a scenario of cellular communications, the pilot sequences used by the user equipments in the cell where the apparatus 100 is located are orthogonal to the pilot sequences used by user equipments in a neighboring cell, and the information acquiring unit 101 may acquire, based on pilot signals respectively corresponding to the user equipments in the cell where the apparatus 100 is located and the user equipments in the neighboring cell, the channel information for the user equipments in the cell where the apparatus 100 is located and the channel information for the user equipments in the neighboring cell.

In the case that the information acquiring unit 101 performs channel estimation based on pilot signals, the information acquiring unit 101 needs to determine pilot sequences corresponding to respective pilot signals in advance. As for the transmission objects, the information acquiring unit 101 knows the pilot sequences used by them in advance, while as for the non-transmission objects, the pilot sequences used by them may be determined in the following manners.

In an example, the information acquiring unit 101 may be configured to determine, based on an ID of a controlling node for the non-transmission objects, pilots which are possible to be transmitted by the non-transmission objects, where each controlling node corresponds to a particular set of available pilots. For example, in cellular communications, the ID can be acquired by monitoring a broadcast from the neighboring cell, or by interacting with the neighboring cell via an X2 interface. Further, the ID may be acquired in advance by pre-storing deployment of the neighboring cell in the base station or by means of a dynamically updated signaling concerning conditions of the neighboring cell from a central controlling apparatus. By knowing the ID of the controlling node, the information acquiring unit 101 can determine a pilot group corresponding to the controlling node, thereby determining, based on the determined pilot group, the pilot sequences used by the non-transmission objects and the channel information for the non-transmission objects. Of course, the information acquiring unit 101 may also determine the pilots transmitted by the non-communication objects by trying pilot sequences not included in the pilot group used by the apparatus 100, which are set by the system.

As another example, the information acquiring unit 101 may be further configured to perform channel estimation based on pilot related information of a non-transmission object acquired from a central controlling apparatus in a wireless communication network or a controlling node of the non-transmission object such as a base station of the neighboring cell in advance, to obtain the channel information for the non-transmission object. Here, the pilot related information may be information on a pilot group to which the pilot of the non-transmission object belongs, and then the information acquiring unit 101 detects the pilots in a pilot group corresponding to the neighboring cell. The pilot related information may also be acquired specific pilot sequences. For example, the base station of the neighboring cell informs the apparatus 100 of pilot sequences used by specific user equipments on the boundary of the neighboring cell which is adjacent to the cell where the apparatus 100 is located.

As an example, the above pilot sequences are reference sequences for a sounding reference signal (SRS) in LTE standards.

In this case, for example, in the cellular communication, the information acquiring unit 101 may acquire information on the pilot group allocated to the neighboring cell of the cell where the apparatus 100 is located. For example, the information acquiring unit 101 can be directly informed of the pilot group of the neighboring cell by the central controlling apparatus, or can be informed of IDs of pilot groups corresponding to cell IDs of all cells in the network by the central controlling apparatus, and find out the pilot group allocated to the neighboring cell according to the cell ID of the neighboring cell.

After the information acquiring unit 101 acquires the channel information for the transmission objects and the non-transmission objects (specifically, by measuring the channel information based on the uplink pilot signal, which can be performed in a manner specified in 3GPP LTE standards, the present disclosure is not limited in this regard) as described above, the interference alleviating unit 102 alleviates interferences to the non-transmission objects based on the acquired channel information.

In an example, the interference alleviating unit 102 is configured to calculate, based on the channel information for the transmission objects and the non-transmission objects, a pre-coding matrix for the transmission objects. By considering the channel information for both the transmission objects and the non-transmission objects during the calculation of the pre-coding matrix, the interferences to the non-transmission objects caused by the transmission in which pre-coding is performed according to the pre-coding matrix can be significantly reduced.

Figure 2:
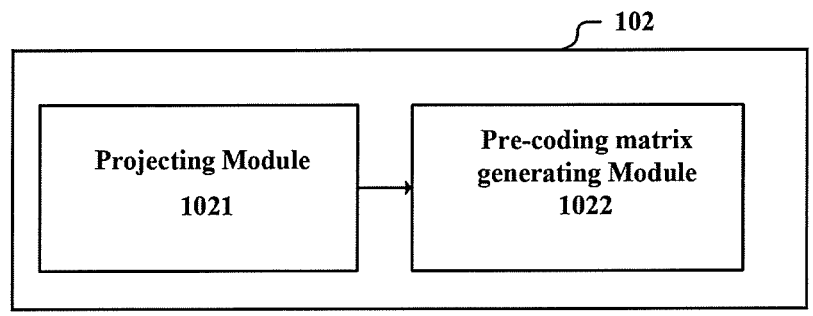
FIG. 2 is a block diagram illustrating an exemplary structure of an interference alleviating unit according to an embodiment of the present disclosure.

FIG. 2 illustrates a block diagram of an exemplary structure of the interference alleviating unit 102 according to an embodiment of the present disclosure. As shown in FIG. 2, the interference alleviating unit 102 includes: a projecting module 1021, configured to acquire, based on the channel information for the non-transmission objects, a channel coefficient matrix for the non-transmission objects, and calculate a projection matrix of the channel coefficient matrix on a null space of a space formed by column vectors of the channel coefficient matrix; and a pre-coding matrix generating module 1022, configured to generate, based on the channel information for the transmission objects and the projection matrix, the pre-coding matrix for the transmission objects.

In the following, the operation and function of the projecting module 1021 and the pre-coding matrix generating module 1022 are described by taking the cellular communication as an example.

It is assumed that the cell served by the apparatus 100 is an m-th cell, and a channel coefficient vector of a channel from a k-th user equipment in a j-th cell to the base station in the m-th cell, that is, the apparatus 100, is indicated by $\hat{h}_{mjk}$, where $\hat{h}_{mjk} \in C^{M \times 1}$, and M indicates the number of antennas of the base station. It is to be noted that, it is assumed herein that the number of the reception antenna of each user equipment is 1 for the sake of simplicity. However, it should be understood that, the user equipment may be provided with multiple antennas, and those skilled in the art can perform corresponding modifications according to the present disclosure for implementing the technical solution of the present disclosure. The acquired channel coefficient matrix of the non-transmission objects is $A_m = [h_{mjk}, \ldots ]$, $j \neq m$, and the projecting module 1021 can calculate the projection matrix by the following equation (I).

$$P_{A_m}^{\perp} = I_M - A_m A_m^{\dagger} \qquad (1)$$

where $A_m^{\dagger} = (A_m^H A_m)^{-1} A_m^H$ is a pseudo-inverse matrix of the channel coefficient matrix $A_m$.

Then, the pre-coding matrix generating module 1022 generates, based on the channel information for the user equipments in the present cell (that is, the m-th cell) and the above matrix, the pre-coding matrix for the user equipments in the present cell.

In an example, the pre-coding matrix generating module 1022 may be configured to generate, based on the channel information for the transmission objects and the projection matrix, equivalent channel coefficients which do not incur interferences to the non-transmission objects, and generate the pre-coding matrix for the transmission objects by using the equivalent channel coefficients.

The cellular communication is still taken as an example. The pre-coding matrix generating module 1022 may perform the calculation by the following equation (2).

$$\overline{H}_{mm} = P_{A_m}^{\perp} \hat{H}_{mm} \qquad (2)$$

where $\hat{H}_{mm} \in C^{M \times K}$, which is a channel coefficient estimation matrix of channels from all of the K user equipments in the m-th cell to the base station of the m-th cell acquired based on the channel information for the user equipments in the m-th cell, and $\overline{H}_{mm}$ indicates the acquired equivalent channel coefficients without inter-cell interferences. The coding matrix is generated based on the equivalent channel coefficients, that is, the matrix $\overline{H}_{mm}$ is taken as the channel matrix, on which operations such as matched filtering pre-coding or zero-forcing pre-coding are further performed.

Further, the pre-coding matrix generating module 1022 may also generate the pre-coding matrix in the following manner. It is to be noted that, the following manner is equivalent to the calculation based on the equation (2).

Firstly, a pre-coding sub-matrix is generated according to the channel information for user equipments in the present cell. According to a sub-matrix generation method based on matched filtering, the sub-matrix is calculated as follows.

$$W_m^{sub} = \hat{H}_{mm}^* \qquad (3)$$

While in a sub-matrix generation method based on zero forcing, the sub-matrix is calculated as follows.

$$W_m^{sub} = \hat{H}_{mm}^*(\hat{H}_{mm}^T P_{A_m}^{\perp} \hat{H}_{mm}^*)^{-1} \qquad (4)$$

Of course, the pre-coding sub-matrix may also be generated using other pre-coding algorithms such as minimum mean-square error (MMSE) pre-coding.

Then, the pre-coding matrix is constructed using the above pre-coding sub-matrix and the projection matrix, as shown by the following equation (5).

$$W_m = P_{A_m}^{\perp} W_m^{sub} \qquad (5)$$

Theoretically, interferences to the non-transmission objects can be eliminated when downlink transmission is performed by pre-coding using the pre-coding matrix as acquired above.

In another example, the interference alleviating unit 102 is configured to acquire, based on the channel information for the transmission objects and the non-transmission objects, a pre-coding matrix of each of the transmission objects by maximizing signal power of the transmission object while maintaining the interferences to the non-transmission objects lower than a predetermined threshold, so as to acquire the pre-coding matrix of the transmission objects.

For example, in the case of cellular communications, for a k-th user in the m-th cell, it is assumed that the pre-coding matrix corresponding to the k-th user is $W_{mk} \in C^{1 \times M}$, where M indicates the number of antennas of the base station, similarly. Here, it is also assumed that the number of the reception antenna of each user equipment is 1 for the sake of simplicity. However, it should be understood that, in the case that the user equipment is provided with multiple antennas, the solution of this embodiment may be implemented with corresponding modification. It is desired to find out a pre-coding matrix $w_{mk}$ which meets the following condition.

$$\max_{w_{mk}} |\hat{h}_{mmk} w_{mk}|^2 \qquad (6)$$
$$\text{s.t.} \sum_{j \neq m} |\hat{h}_{mjk} w_{mk}|^2 < \delta$$

where $\hat{h}_{mmk}$ and $\hat{h}_{mjk}$ have the same definitions as the above example. δ is a threshold for evaluating the inter-cell interferences. The first row of the equation (6) indicates finding a pre-coding matrix capable of maximizing the power of the signal useful to the present cell, and the second row of the equation (6) indicates finding a pre-coding matrix capable of maintaining the inter-cell interferences lower than a predetermined threshold. It should be understood that, in this example, the generation of the pre-coding matrix becomes a optimization problem, and the acquired solution may not completely eliminate the inter-cell interferences. However, since the power of the signal useful to the present cell is maximized, a desirable signal-to-interference ratio can still be obtained, thereby improving the overall performance of the system. The optimization problem can be considered as a tradeoff between the power of the signal useful to the present cell and interference power to user equipments in other cells.

In some examples of the present disclosure, for example, in a TDD (Time Division Duplex) communication system, after the interference alleviating unit 102 generates the pre-coding matrix for the transmission objects, the apparatus 100 may perform pre-coding processing on data to be transmitted to the transmission objects using the pre-coding matrix, and transmit the pre-coded data to the transmission objects using a transmitter. In addition, the interference alleviating unit 102 may adapt the pre-coding matrix according to channel variation of the transmission objects/non-transmission objects acquired by the information acquiring unit 101, in order to achieve interference alleviating dynamically and constantly.

In summary, with the apparatus 100 according to this embodiment, which uses the channel information of both the transmission objects and the non-transmission objects, interferences to the non-transmission objects can be reduced or even eliminated, thereby efficiently increasing the downlink capacity.

<Second Embodiment>

Figure 3:
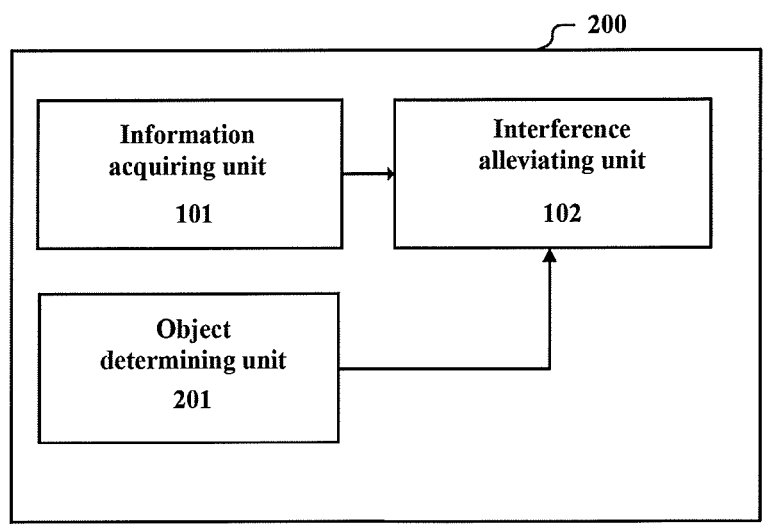
FIG. 3 is a block diagram illustrating a structure of an apparatus for wireless communications according to another embodiment of the present disclosure.

FIG. 3 illustrates a block diagram of a structure of an apparatus 200 for wireless communications according to another embodiment of the present disclosure. Besides the components shown in FIG. 1, the apparatus 200 further includes: an object determining unit 201, configured to determine the non-transmission objects according to parameters related to interferences to the non-transmission objects, where the related parameters includes at least one of geographical locations of the non-transmission objects and signal reception situations of the non-transmission objects, and the interference alleviating unit 102 is configured to take the non-transmission objects determined by the object determining unit 201 as the non-transmission objects to which interferences are considered to be alleviated.

The apparatus 200 can appropriately select non-transmission objects to be considered during the calculation of interference alleviating by incorporating the object determining unit 201, and thus the related calculations can be further simplified.

As an example, the object determining unit 201 may be configured to determine non-transmission objects from which signals of intensities higher than a predefined threshold are received as the non-transmission objects to be considered. For example, the object determining unit 201 may perform the determination by measuring the amplitude such as RSRP (Reference Signal Received Power) of a received pilot signal transmitted by the user equipment. Specifically, for example, in the case that RSRP of a SRS (sounding reference signal) signal received from a user equipment which does not belong to the present cell exceeds a predefined threshold, the user equipment is determined as the non-transmission object to be considered.

Alternatively or as a supplement, the object determining unit 201 may be configured to determine non-transmission objects of which geographical locations are within a predetermined range as the non-transmission objects to be considered. That is because geographically farther non-transmission objects are generally less affected by interferences because of the existence of path loss, and thus the impacts on them can be neglected.

The predetermined range or the predetermined threshold can be determined for example with reference to the description of an apparatus 500 hereinafter. Of course, they also can be determined in other manners, for example, by experiments or by empirical values.

Specifically, the object determining unit 201 may determine the non-transmission objects through cooperation among apparatus. For example, in a cellular communication scenario, a base station in each cell acquires location information and channel quality information of user equipments served by the base station. The above information is shared among cells through cooperation among base stations, in order to select the non-transmission objects to be considered. For example, if a first base station determines, according to a geographical location of its user equipment, that a distance from the user equipment to a cell served by a second base station is smaller than a threshold, the first base station determines to provide pilot sequences of the user equipment to the second base station. Correspondingly, the second base station acquires the information of the user equipment and determines the user equipment as the non-transmission object to be considered (that is, the non-transmission object from which the distance to the present cell is smaller than the threshold). Meanwhile, the second base station estimates, based on the pilot sequences of the non-transmission object, the situation of a channel from the non-transmission object to the second base station, thereby performing interferences alleviating. In the case that the first base station also provides the geographical location of the user equipment, the second base station may also determine a user equipment around the geographical location which is served by the second base station, and determine the user equipment as a transmission object associated with the non-transmission object, thereby performing targeted interference alleviating. As another example, the first base station firstly selects user equipments with poor channel quality as edge user equipments, and shares their pilot sequences, channel qualities and geographical locations with a neighboring second base station. The second base station determines, based on the information provided by the first base station, the non-transmission objects to be considered. For example, the second base station determines only user equipments of which the channel qualities are lower than a first threshold and from which the distance to the present cell is smaller than a second threshold as the non-transmission objects.

In summary, the related parameters may also include various parameters affecting the interferences to the non-transmission objects, for example, the related parameters of the present cell such as the transmission power, the utilized spectrum, the topography within the coverage of the present cell and the like. The related parameters may also (for example, in the case that the channel information for the non-transmission objects need to be estimated) include related parameters of the neighboring cell (need to be acquired from the neighboring cell) such as the topography of the edge of the cell, the locations of the cell edge user equipments (candidate non-transmission objects), the utilized spectrum, the requirement on a signal-to-interference-and-noise ratio (SINR), the current channel quality indication (CQI) and the receiver sensitivity.

Figure 4:
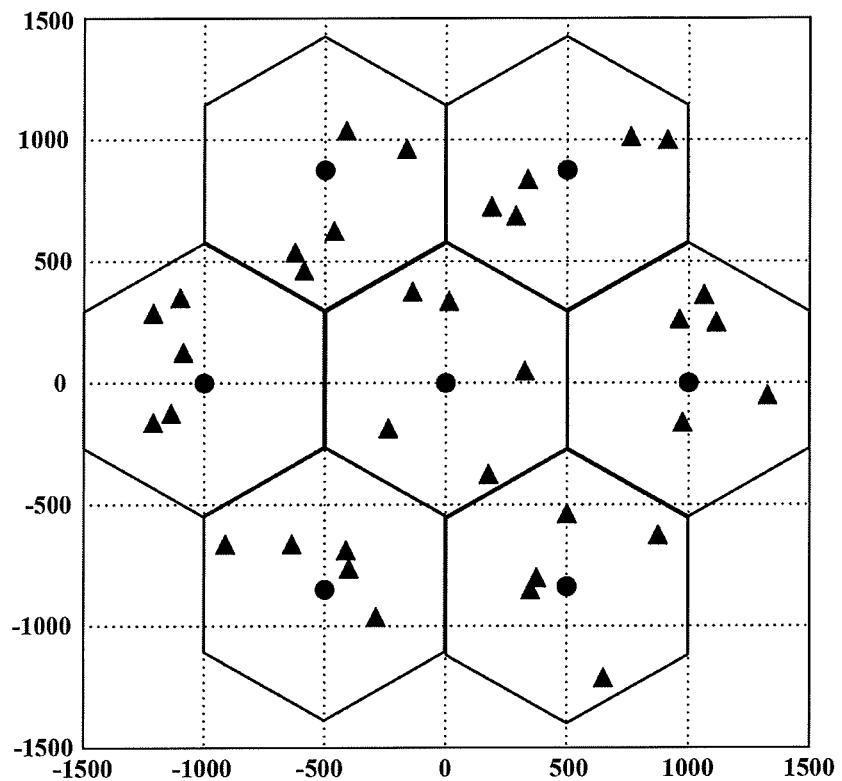
FIG. 4 is a schematic diagram illustrating a constitution of a communication network of an exemplary system.

In the following, a system example where interference alleviating is performed using the apparatus 100 or 200 is described with reference to FIGS. 4 to 7. Specifically, FIG. 4 illustrates a schematic diagram of a homogeneous network consisting of 7 hexagonal cells, where base stations are located at centers of the cells. A radius of each cell is set to D=500 m, while distances between user equipments and the base stations in the cells are generated randomly. It is assumed that K user equipments are served in each cell simultaneously, and the base station in each cell is provided with M antennas. Round spots at the centers of the cells indicate base stations in the cells, and triangular spots indicate user equipments. It is assumed that large-scale fading of a channel model is determined by only path loss and shadow fading is not considered, and it is also assumed that a path loss coefficient is 3.

Figure 5:
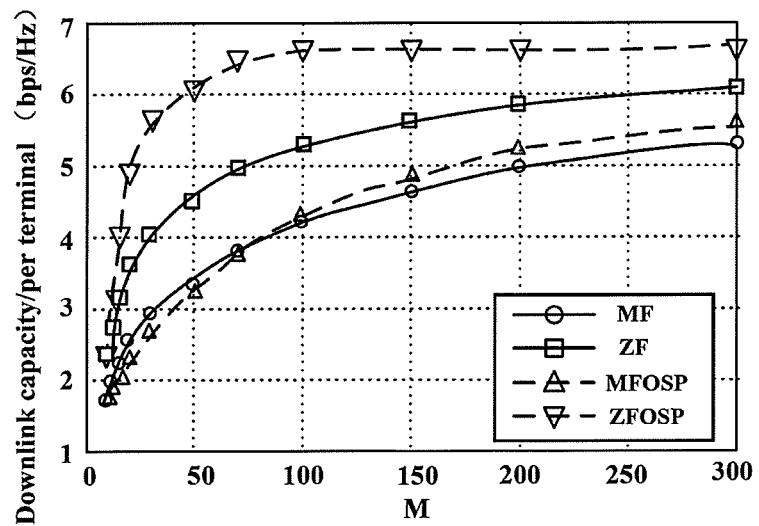
FIG. 5 is a graph illustrating a simulation result of the exemplary system shown in FIG. 4.

FIG. 5 illustrates a variation tendency of an average downlink capacity of user equipments with the increase of the number of antennas M, in the case that the signal-to-noise ratios of the base station and the user equipments are both set to 20 dB. An average downlink capacity of the user equipments in the m-th cell is calculated by the following equation:

$$C_m = E[\log_2(1+SINR_{mk})], k=1,2,\ldots,K$$

where $SINR_{mk}$ indicates the signal-to-interference-and-noise ratio of a k-th user in the m-th cell. Dotted lines in FIG. 5 indicate simulation results acquired by adopting the apparatus 100, that is, all non-transmission objects are considered when calculating the pre-coding matrix, and thus the simulation results can be considered as the best performance achievable with the technology according to the present disclosure. Solid lines indicate simulation results acquired with conventional pre-coding methods, where circles and upper triangles indicate simulation results acquired using the matched filtering pre-coding algorithm (MFOSP indicates a pre-coding algorithm based on matched filtering), and squares and lower triangles indicate simulation results acquired using the zero-forcing pre-coding algorithm (ZFOSP indicates a pre-coding algorithm based on zero forcing).

As can be seen, the user average capacities acquired using the pre-coding algorithm according to the present disclosure are obviously better than results acquired using the conventional pre-coding methods. That is because interferences to user equipments in the neighboring cells are considered so as to suppress the inter-cell interferences, thereby improving the average capacities of users.

Figure 6:
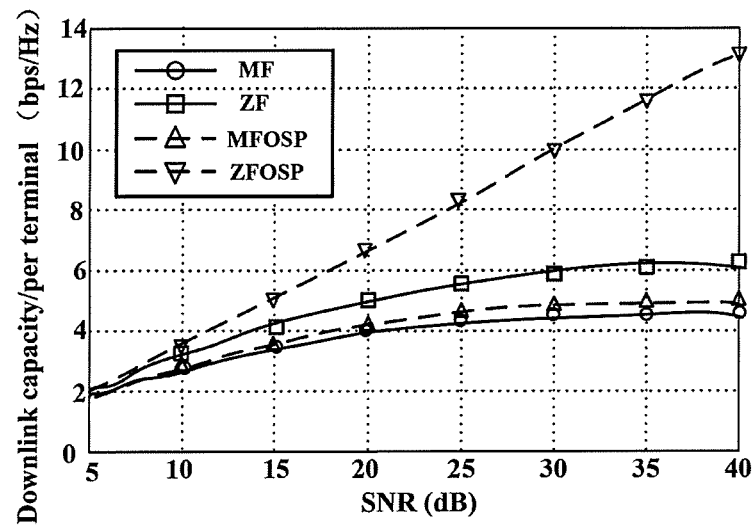
FIG. 6 is a graph illustrating a simulation result of the exemplary system shown in FIG. 4.

FIG. 6 illustrate a variation tendency of an average downlink capacity of user equipments with SNR, where the number of antennas of the base station is fixed to 100, and the number of user equipments in each cell is fixed to 5. Definitions of curves in FIG. 6 are the same as the definitions of curves in FIG. 5. Similarly, as can be seen, a better performance can be acquired using the technology according to the present disclosure as compared with the conventional methods.

It should be understood that, in the case that the processing is performed using the apparatus 200, that is, only a part of the non-transmission objects are considered, the acquired performance curves would be located between respective dotted lines and solid lines as shown in FIGS. 5 and 6.

Figure 7:
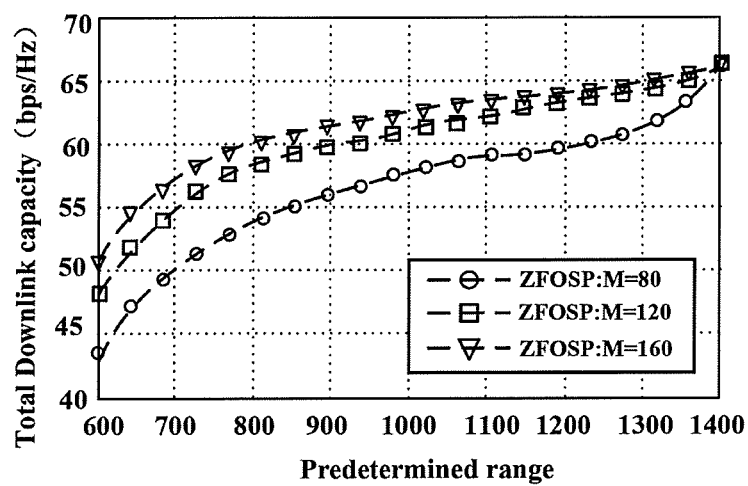
FIG. 7 is a graph illustrating a simulation result of the exemplary system shown in FIG. 4.

FIG. 7 illustrates a variation tendency of an average downlink capacity of user equipments with the predetermined range of the non-transmission objects which are taken into consideration, which is acquired using the apparatus 200 based on the zero-forcing pre-coding algorithm, where a signal-to-noise ratio is fixed to 20 dB, and the number K of user equipments in each cell is fixed to 10. The three curves from top to bottom in FIG. 7 are respectively acquired under the condition that the number of antennas M of the base station equals to 160, 120 and 80. In this example, the predetermined range is indicated by a radius of a circle centered on the base station. As can be seen, the user average capacity increases as the predetermined range is expanded. Moreover, when the predetermined range is relatively small, the user average capacity can be significantly improved by expanding the predetermined range; and when the predetermined range is relatively large, since most of the user equipments in the neighboring cell are already covered, the gain acquired by further expanding the predetermined range is relatively small.

It should be understood that, the system example is only for the purpose of illustration and is not to be construed as limiting the scope of the present disclosure.

<Third Embodiment>

Figure 8:
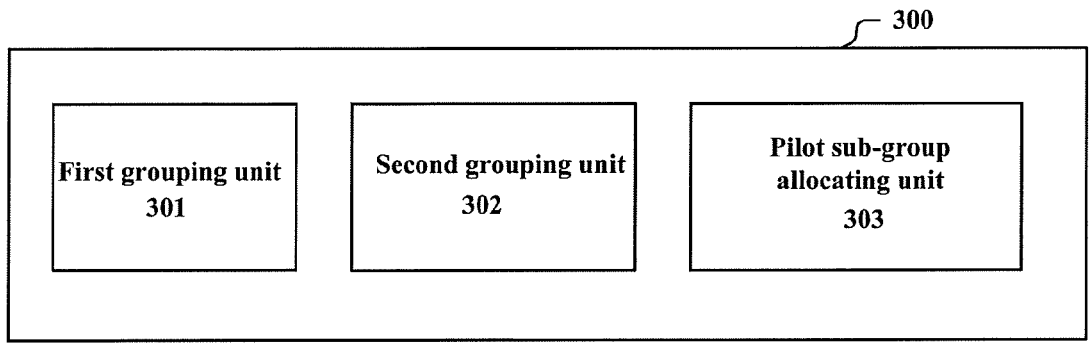
FIG. 8 is a block diagram illustrating a structure of an apparatus for use in a wireless communication system according to an embodiment of the present disclosure.

In the following, an apparatus 300 for wireless communications according to another embodiment of the present disclosure is described with reference to FIG. 8, which illustrates a block diagram of a structure of the apparatus 300. The apparatus 300 includes: a first grouping unit 301, configured to divide pilot sequences for wireless communication into a cell center pilot group to be used for communication devices in a center of a cell and a cell edge pilot group to be used for communication devices in an edge of the cell; a second grouping unit 302, configured to divide the cell edge pilot group into multiple cell edge pilot sub-groups which do not overlap with each other; and a pilot sub-group allocating unit 303, configured to allocate different cell edge pilot sub-groups to neighboring cells, where the pilot sequences contained in the cell center pilot group are multiplexed by neighboring cells.

For example, the apparatus may be implemented as any type of server for providing controlling services to multiple cells/base stations, such as a tower server, a rack server or a blade server. The apparatus 300 may be a control module installed on the server (such as an integrated circuit module including a single wafer, and a card or a blade inserted into a slot of the blade server).

Figure 9:
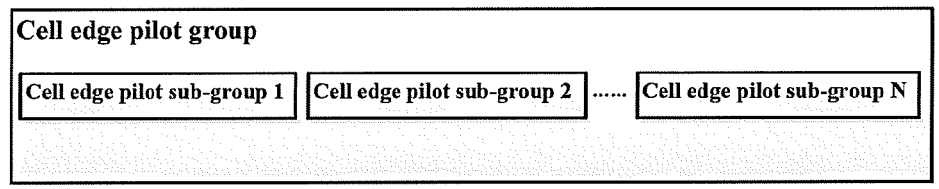
FIG. 9 is a schematic diagram illustrating dividing of cell edge pilot sub-groups.
Figure 10:
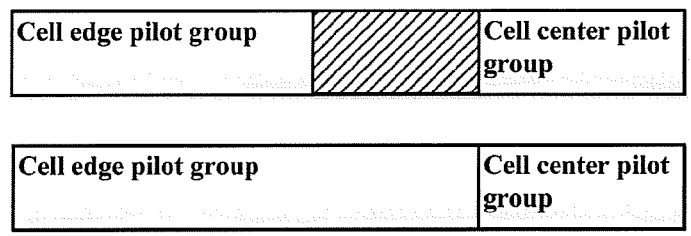
FIG. 10 is a schematic diagram illustrating dividing of cell edge pilot groups and cell center pilot groups.

As previously described, the number of available pilot sequences is limited by the coherence length of the channel. Thus, various technologies are required to increase the utilization efficiency of the pilot sequences. In the apparatus 300, the pilot sequences are divided into the cell center pilot group to be used for user equipments at the center of the cell and the cell edge pilot group to be used for user equipments at the edge of the cell. In addition, the cell edge pilot group is further divided into several (for example, N, where N is greater than or equal to 1) cell edge pilot sub-groups to be used for edge user equipments of different cells, thereby avoiding pilot pollution to the neighboring cell. As shown in FIG. 9, these cell edge pilot sub-groups do not overlap with each other, that is, each of these cell edge pilot sub-groups includes different pilot sequences. On the other hand, preferably, pilot sequences contained in the cell edge pilot group and pilot sequences in the cell center pilot group do not overlap with each other. However, as an alternative example, pilot sequences in the cell edge pilot group and pilot sequences in the cell center pilot group may partially overlap with each other, thereby increasing flexibility of pilot sequence allocation, in order to cope with a scenario where the number of the pilot sequences cannot meet the requirements of the user equipments, for example due to the number of the cell center user equipments or the cell edge user equipments suddenly increasing. As shown in FIG. 10, a diagonally shaded portion indicates overlapped pilot sequences. In the case that there is an overlap between the cell center pilot group and the cell edge pilot group, the pilot sub-group allocating unit 303 should ensure that there is no overlap between cell edge pilot sub-groups allocated to neighboring cells.

Therefore, the apparatus 300 may allocate cell edge pilot sub-groups which are different from each other and the same cell center pilot group to neighboring cells (thereby achieving pilot multiplexing between neighboring cells), in order to facilitate, for example, the cell to allocate the pilot sequences in the cell edge pilot sub-group to cell edge user equipments, while allocate the pilot sequences in the cell center pilot group to cell center user equipments. The cell edge user equipments are susceptible to interferences from user equipments in the neighboring cell, while the cell center user equipments have better channel conditions and are less susceptible to interferences from user equipments in the neighboring cell. In this way, according to the present disclosure, pilot are allocated according to different channel conditions of the cell edge and the cell center, and thus limited pilot sequences can be fully utilized, while avoiding the pilot pollution.

It is to be noted that, in the case that the system adopts a static setting of the cell center pilot group and the cell edge pilot group, that is, in the case that the cell center pilot group and the cell edge pilot group are determined in advance in accordance with the method of the present disclosure in communication protocols, the apparatus 300 may not include the above first grouping unit 301. In addition, in the case that the system adopts static cell edge pilot sub-groups, that is, in the case that the cell edge pilot sub-groups included in the cell edge pilot group are determined in advance in communication protocols, the apparatus 300 may not include the above second grouping unit 302.

Figure 11:
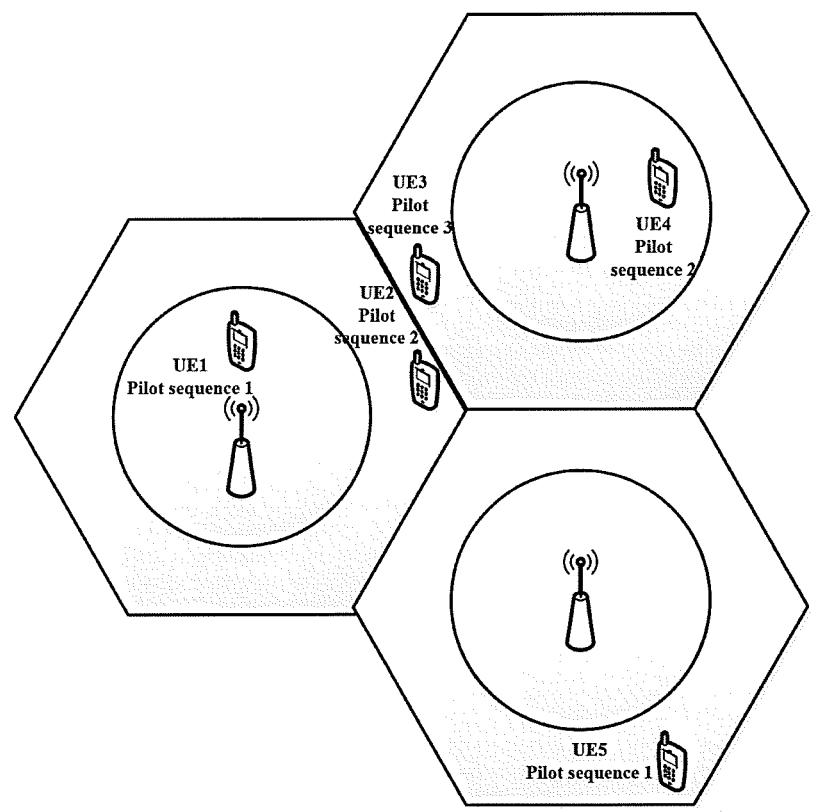
FIG. 11 is an example illustrating allocation of pilot sequences according to an embodiment of the present disclosure.

FIG. 11 illustrates a schematic diagram of an example of pilot sequence allocation, where each hexagon represents a cell, and a circular region in each hexagon represents the center region of the cell. As can be seen, the cell edge pilot sequences for the three neighboring cells are different from each other. In addition, a situation where the cell edge pilot sub-group partially overlaps with the cell center pilot group is shown in FIG. 11.

Figure 12:
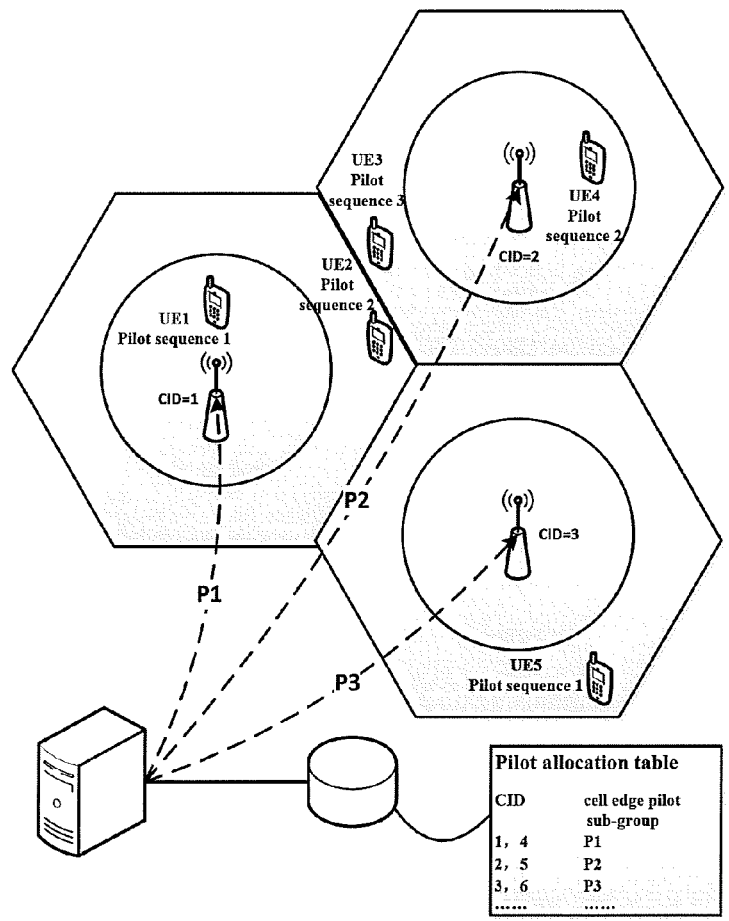
FIG. 12 is an example illustrating allocation of pilot sequences according to an embodiment of the present disclosure.

Further, the pilot sub-group allocating unit 303 may allocate cell edge pilot sub-groups which are different from each other to neighboring cells in various manners. For example, cell edge pilot sub-groups may be allocated according to a mod(CID, N) operation, where CID is the cell ID, or may be allocated after calculation based on, for example, a coloring algorithm. FIG. 12 illustrates a diagram of an example of the cell edge pilot sub-groups allocated using the mod(CID, N) operation. In addition, FIG. 12 also illustrates a pilot allocation table for determining a correspondence between cell IDs and the allocated cell edge pilot sub-groups. The pilot allocation table may be stored in the apparatus 300 or a storage apparatus external to the apparatus 300 (as shown in FIG. 12).

In an example, the pilot sub-group allocating unit 303 is further configured to transmit information containing a plurality of cell IDs and cell edge pilot sub-groups respectively corresponding to the plurality of cell IDs to each cell. In an alternative manner, each cell is exclusively informed of the cell edge pilot sub-group corresponding to the cell. In addition, protocols of both the transmission party and the reception party can be specified in advance, and it is not necessary to inform each cell of the allocation situations. Instead, each cell calculates by itself an ID of the corresponding cell edge pilot sub-group using the CID according to the specification of the protocols, and acquires the pilot sequences contained in the cell edge pilot sub-group according to the protocols. It should be understood that, in this case, since both the transmission party and the reception party provided with the protocols about grouping in advance, that is, each group including which pilot sequences is known to the reception party by default, it is not necessary for the pilot sub-group distribution unit 303 to perform transmission additionally.

Alternatively or as a supplement, the pilot sub-group allocating unit 303 is further configured to transmit identifiers of the cell edge pilot sub-groups and pilot sequences contained in the edge cell pilot sub-groups to each cell. In this case, there is no protocol about grouping definition at both the transmission party and the reception party. Instead, the pilot sub-group allocation unit 303 informs each cell of the grouping definition. This manner can support dynamic grouping. For example, each cell may be informed when the grouping definition is updated.

In an example, the apparatus 300 functions as a central controlling node for allocating available cell center pilots and cell edge pilots to cells controlled by the apparatus 300, where the apparatus 300 may communicates with other nodes such as base stations of the cells in a wired or wireless manner.

As described above, the apparatus 300 divides the pilot sequences into the cell center pilot group and the cell edge pilot group, thereby increasing the multiplexing efficiency of pilot sequences, and thus the communication system is able to accommodate more user equipments.

<Fourth Embodiment>

Figure 13:
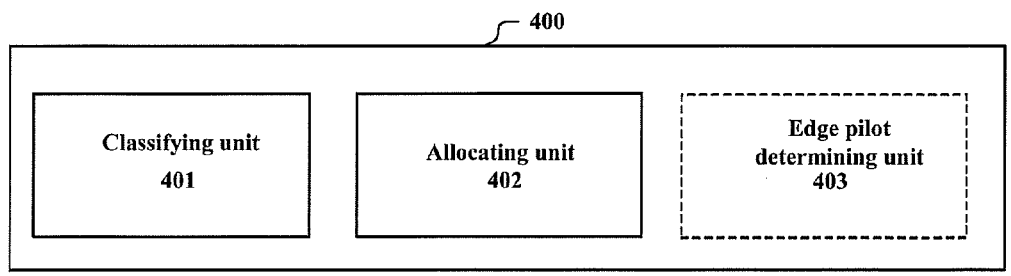
FIG. 13 is a block diagram illustrating a structure of an apparatus for wireless communications according to an embodiment of the present disclosure.

FIG. 13 illustrates a block diagram of a structure of an apparatus 400 for wireless communications according to another embodiment of the disclosure. The apparatus 400 includes: a classifying unit 401, configured to classify communication devices in a cell into cell center communication devices and cell edge communication devices; and an allocating unit 402, configured to allocate at least part of pilot sequences in a cell center pilot group to the cell center communication devices, and allocate at least part of pilot sequences in a cell edge pilot group to the cell edge communication devices, where the apparatus 400 and neighboring cells multiplex the cell center pilot group, and the apparatus 400 and the neighboring cells do not multiplex the at least part of pilot sequences in the cell edge pilot group.

The communication devices described herein may be user equipments such as mobile terminals, vehicles, intelligent wearable devices, or infrastructures such as small cell base stations.

Figure 14:
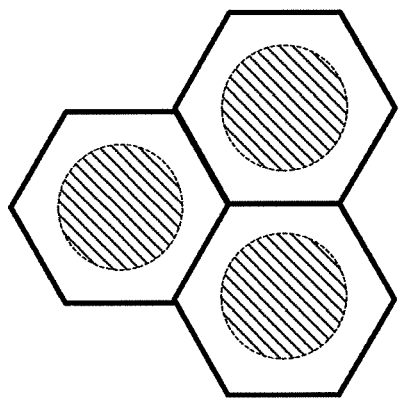
FIG. 14 is an example of performing classification based on locations of the communication devices.

In an example, the classifying unit 401 can perform classification based on channel measurement results or location information of the communication devices. FIG. 14 illustrates an example of performing classification based on locations of the communication devices. Specifically, each cell is divided into two portions according to distances to the center base station, where diagonally shaded portions indicate the cell center portion, and the rest portions are the cell edge portion. As described above, the communication devices located in the cell center portion are closer to the base station of the present cell, with smaller signal attenuation and better channel transmission condition, and are subjected to lower inter-cell inferences from neighboring cells. However, the communication devices located in the cell edge portion are subject to larger signal attenuation and more susceptible to interferences from neighboring cells.

In addition, the classifying unit 401 may determination the path losses in conjunction with information such as locations of communication devices and a transmission model, and classifies communication devices of which path losses are smaller than a predetermined value as the cell center communication devices, and classifies communication devices of which the path losses are greater than the predetermined value as the cell edge communication devices.

Alternatively, the classifying unit 401 can perform classification based on channel measurement results, where the communication devices with good channel conditions are classified as the cell center communication devices, and the communication devices with poor channel conditions are classified as the cell edge communication devices. In an example, the classifying unit 401 is configured to receive a pilot signal from a communication device, detect signal power of the communication device by the pilot signal, and classify the communication device as the cell center communication device in the case that the signal power is higher than a certain threshold, and classify the communication device as the cell edge communication device in other cases.

The cell center communication devices acquired as above are subjected to very low interferences from neighboring cells and therefore may multiplex the same cell center pilot group without significant performance degradation. In contrast, the cell edge communication devices are susceptible to inter-cell inferences and therefore need to use pilot sequences which are orthogonal to each other.

Further, as shown in a dashed block in FIG. 13, the apparatus 400 may further include: an edge pilot determining unit 403, configured to determine, based on an ID of the cell, at least part of pilot sequences in the cell edge pilot group which are used for the present cell, wherein the cell edge pilot group is divided into a plurality of cell edge pilot sub-groups, and the at least part of pilot sequences are contained in a particular cell edge pilot sub-group.

The above cell edge pilot group may be informed to the apparatus 400 by a central controlling node, or may be determined by the apparatus 400 itself according to a predetermined protocol. The central controlling node described herein may include for example the apparatus 300 in the third embodiment, but is not limited thereto.

Specifically, as described above, the central controlling node calculates the cell edge pilot group for each cell by using the mod(CID, N) operation or the coloring algorithm, and the edge pilot determining unit 403 acquires information on the edge pilot sub-groups according to the ID of the cell. This information may include for example the 1D of the cell and IDs of the cell edge pilot sub-groups corresponding to the ID of the cell, and may also include the pilot sequences contained in the cell edge pilot sub-groups. In the case that the specifically contained pilot sequences are transmitted, a dynamic configuration may be achieved. In the case that the IDs of the cell edge pilot sub-groups are transmitted, the edge pilot determining unit 403 may determine the available cell edge pilot sequences for example by querying a table provided by the central controlling node or a server, where the table is generated in advance according to protocols predefined by both the transmission party and the reception party.

As another example, the edge pilot determining unit 403 may perform calculation by itself according to the ID of the cell using the mod(CID, N) operation, and determine the cell edge pilot sub-groups to be used according to the calculation results based on the predefined protocols.

Further, in the case of combining the present embodiment with the second embodiment, since the edge communication devices in neighboring cells are allocated pilot sequences which are orthogonal to each other, channel information for cell edge communication devices in neighboring cells can be accurately acquired through channel estimation, thereby facilitating elimination of inter-cell interferences.

Since lengths of available orthogonal pilot sequences are limited by the correlation time of the channel, it cannot be ensured that all of the cell edge communication devices in all of the cells use pilot sequences which are orthogonal to each other. In this case, the cells may be divided into groups, and neighboring cells are divided into one group, so as to ensure that the cell edge communication devices in the cells of the same group use pilot sequences which are orthogonal to each other, while different cell groups may use the same pilot group.

In addition, the classifying unit 401 may also dynamically classify the communication devices. Correspondingly, the allocating unit 401 dynamically performs the allocation. For example, the classifying unit 401 may re-perform classification when a variation of locations of the communication devices, a path loss or other channel conditions exceeds a predetermined degree. Of course, the classifying unit 401 may also perform classification periodically.

The apparatus 400 classifies communication devices into cell center communication devices and cell edge communication devices and allocate pilot sequences to them differently, such that the cell center communication devices in neighboring cells multiplex the cell center pilot group, and the cell edge communication devices in neighboring cells use different pilot sequences, thereby reducing the interferences to the cell edge communication devices while increasing pilot multiplexing efficiency as much as possible.

<Fifth Embodiment>

Figure 15:
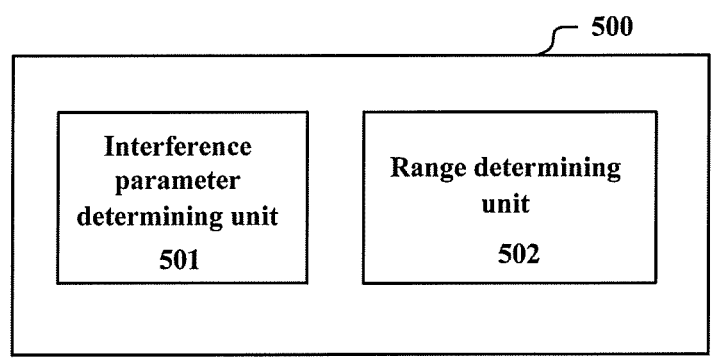
FIG. 15 is a block diagram illustrating a structure of an apparatus for wireless communications according to an embodiment of the present disclosure.

FIG. 15 illustrates a block diagram of a structure of an apparatus 500 for wireless communications according to an embodiment of the disclosure. The apparatus 500 includes: an interference parameter determining unit 501, configured to determine parameters related to interferences to non-transmission objects; and a range determining unit 502, configured to determine, based on the parameters, a range of non-transmission objects to which interferences are to be considered, where transmission by transmission objects of the apparatus 500 is controlled by the apparatus 500 and transmission by the non-transmission objects is not controlled by the apparatus 500.

The apparatus 500 is configured to determine the range of the non-transmission objects to which interferences are to be considered, where the determination may be performed based on different parameters.

In an example, the interference parameter determining unit 501 is configured to take geographical locations of the non-transmission objects as the parameters, and the range determining unit 501 is configured to determine the non-transmission objects of which the geographical locations are within a predetermined range as the non-transmission objects to be considered.

Figure 16:
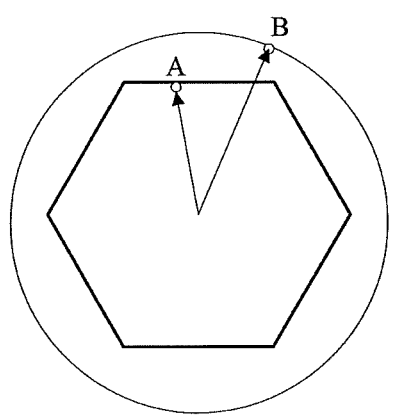
FIG. 16 is a schematic diagram illustrating an example of selection of a predetermined range according to an embodiment of the present disclosure.

FIG. 16 illustrates a schematic diagram of an example of selection of the above predetermined range. In this example, the cellular communication is taken as an example, the above predetermined range is determined according to the path loss and a size of the cell. For example, a region between locations where power attenuation of signals received by the cell edge user equipments in the cell is x dB and the base station is selected as the predetermined range. A hexagon in FIG. 16 represents a cell, where a cell edge user A is a reference user. Only the path loss is considered. Assuming that the power received by the user is P, and the power received by a user equipment B is attenuated by x dB as compared with the user A. In this example, a circle with a radius being a distance between the location of the user B and the base station is taken as the predetermined range. It should be understood that, FIG. 12 only illustrates an example, and the predetermined range can be determined in other manners. For example, multiple user equipments B may be determined and a region surrounded by the multiple user equipments B may be determined as the predetermined range.

In this method, a size of the predetermined range is determined by x, and is also related to a type of the cell. In the case that the cell is a macro cell and the neighboring cells are also macro cells, x may be selected to be relatively small, since a macro cell is generally large and thus the signal attenuation caused by the path loss is significant. In the case that the cell is a macro cell and the neighboring cells include small cells, x may be selected to be relatively large, considering that a small cell base station has a low emitting power and thus user equipments in the small cell are more susceptible to interferences from the macro cell, such that some or even all of the small cells are included in the predetermined range. In the case that the cell is a small cell, x may be selected to be relatively small, since a small cell base station has a low emitting power and thus produces lower interferences to user equipments in neighboring cells.

In this case, the base station where the apparatus 500 is located may determine the non-transmission objects to be considered (that is, the cell edge user equipments in neighboring cells) in the follow manner: a base station in a neighboring cell collects the location information of its cell edge users, and shares the location information of the cell edge users through cooperation between base stations of neighboring cells. The base station of the present cell determines whether the cell edge users are within the predetermined range according to the location information. The location information may include a coordinate of the user, a distance to the user and an azimuth of the user, and the like.

In another example, the interference parameter determining unit 501 is configured to take intensities of signals received from the non-transmission objects as the parameters, and the range determining unit 502 is configured to determine the non-transmission objects from which a signal of the intensity higher than a predefined threshold is received as the non-transmission objects to be considered.

This implementation is not related to actual distances, and may be considered as selection of the predetermined range in a signal dimension. For example, the amplitudes of the pilot signals transmitted by the non-transmission objects may be taken as the parameters.

Specifically, the above predefined threshold may be determined according to a size of the cell. For example, the predefined threshold may be set as an energy value acquired by attenuating the signal energy, which is transmitted by the cell edge user, subjected to the path loss and received by the base station, by a further x dB. Reference is still made to FIG. 16, where only the path loss is considered. It is assumed that the pilot signal energy received by the base station from the user A is P. If the pilot signal energy received by the base station from a user equipment B is attenuated by a value smaller than x dB, as compared with the user A, it is indicated that the signal intensity of the user B is higher than the predetermined threshold, and the user B is the non-transmission object to be considered.

Similarly, the determination of x is also related to the type of the cell. Specifically, if the present cell is a macro cell, and the neighboring cells are also macro cells, x may be relatively small. If the present cell is a macro cell, and the neighboring cells are small cells, x may be relatively large. If the present cell is a small cell, x may be relatively small.

As yet another example, the interference parameter determining unit 501 is configured to take geographical locations and channel quality information of the non-transmission objects as the parameters, and the range determining unit 502 is configured to determine the non-transmission objects of which the channel quality is lower than a certain degree and of which the geographical locations are within a predetermined range as the non-transmission objects to be considered.

A case of cellular communication is taken as an example. For example, the cell edge user equipments in neighboring cells report their location information and channel quality information to respective base stations, and such information is shared among cells through cooperation between base stations. The base station of the present cell selects user equipments of which the channel qualities are lower than a certain degree, determines, according to the shared location information, whether these user equipments are within the predetermined range, and selects user equipments within the predetermined range as the non-transmission objects.

In this case, the apparatus 500 is a base station device, the transmission objects are user equipments in the cell served by the apparatus 500, the non-transmission objects are user equipments in cells served by other base station devices. The geographical locations and channel quality information of the user equipments in each cell are shared among base station devices of the cells. The channel quality information may be indicated by the channel quality indication (CQI) in the existing LTE-A, the location information may be coordinates of the user equipments, or a distance and azimuth from the user equipments to the present cell.

In this example, since the influence of the path loss, the shadow fading and small-scale fading are considered simultaneously, the selected non-transmission objects are more susceptible to interferences from the present cell.

The apparatus 500 may used in the determination of the non-transmission objects in the second embodiment, thereby reducing the computational load while reducing the interferences to the non-transmission objects and enhancing the overall performance of the system. However, the apparatus 500 is not limited thereto. Instead, the apparatus 500 may be used in conjunction with other pre-coding methods, interference alleviating methods and the like concerning the non-transmission objects.

It should be understood that, the technology according to the disclosure is applicable to various products. In the following, two application examples of the apparatus 100, 200, 400, and 500 according to the present disclosure are provided with reference to FIGS. 17 and 18. In general, the apparatus 100, 200, 400 and 500 may be implemented as any type of evolved node B (eNB), such as a macro eNB and a small eNB. The small eNB may be an eNB such as a pico eNB, a micro eNB, and a home (femto) eNB that covers a cell smaller than a macro cell. Alternatively, the apparatus 100 may be implemented as any other types of base stations such as a NodeB and a base transceiver station (BTS). The apparatus 100, 200, 400 and 500 may include: a main body (that is also referred to as a base station apparatus) configured to control radio communication, and one or more remote radio heads (RRH) disposed in a different place from the main body. Further, some terminals may operate as the apparatus 100, 200, 400, and 500 by performing the base station function temporarily or semi-permanently. The apparatus 100, 200, 400, and 500 may be for example base-band cloud apparatus under the C-RAN (Cloud-RAN/Centralized-RAN) architecture, such as any BBU in BBU pools connected in high-speed connections with each other under the C-RAN architecture.

Figure 17:
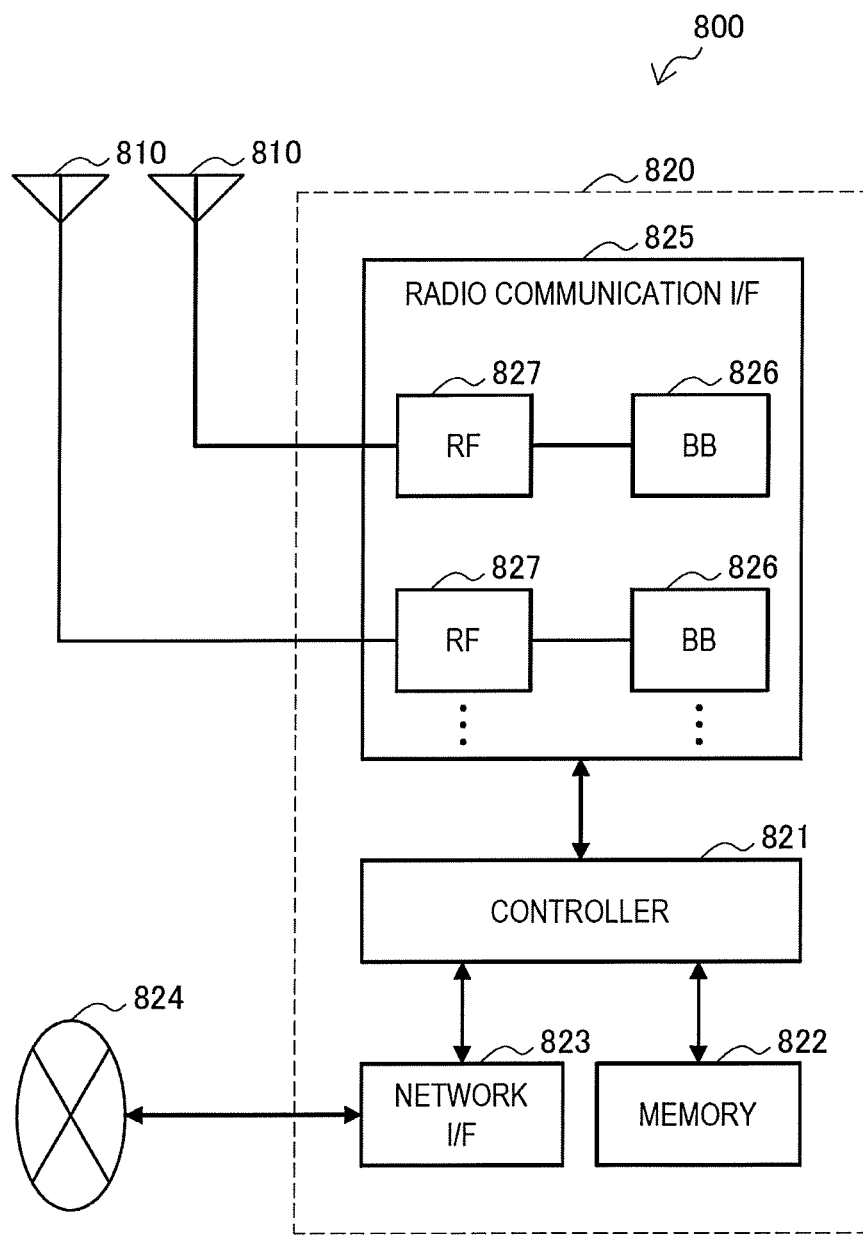
FIG. 17 is a block diagram illustrating a first example of a schematic configuration of an evolved Node B (eNB)

FIG. 17 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 17. For example, the multiple BB processors 826 may be compatible with multiple frequency bands used by the eNB 800. The radio communication interface 825 may include the multiple RF circuits 827, as illustrated in FIG. 17. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

Figure 18:
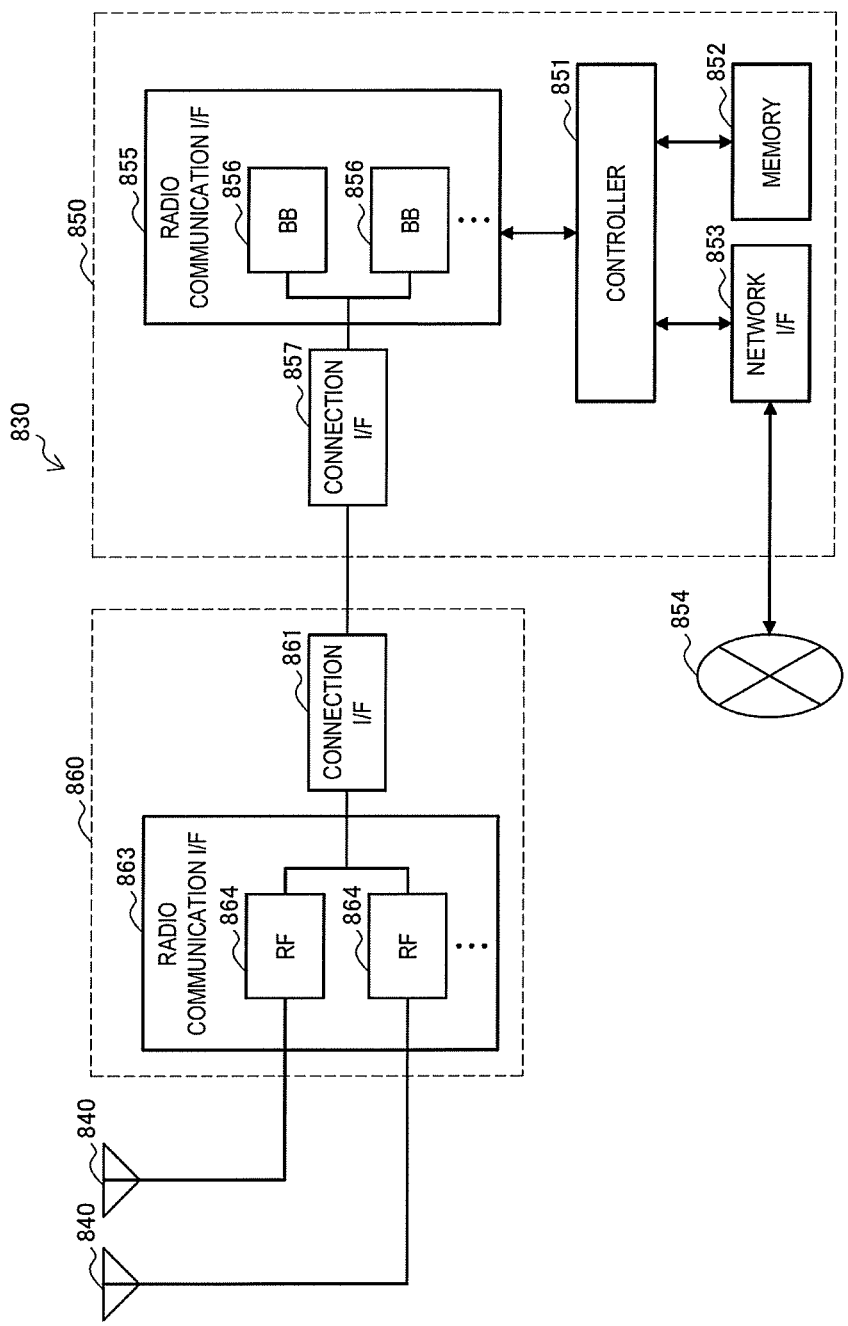
FIG. 18 is a block diagram illustrating a second example of a schematic configuration of an eNB.

FIG. 18 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The radio communication interface 855 may include the multiple BB processors 856, as illustrated in FIG. 18. For example, the multiple BB processors 856 may be compatible with multiple frequency bands used by the eNB 830. Although FIG. 18 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 18. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the eNB 800 and eNB 830 shown in FIG. 17 and FIG. 18, the information acquiring unit 101, the interference parameter determining unit 501 and the like described with reference to FIGS. 1, 3 and 15 may be implemented by the radio communication interface 825 and the radio communication interface 855 and/or the radio communication interface 863. At least a part of the functions may also be implemented by the controller 821 and the controller 851. For example, the controller 821 or the controller 851 may alleviate the interferences to the non-transmission objects based on the channel information for the transmission objects and the non-transmission objects by executing the function of the interference alleviating unit 102, and may determine non-transmission objects according to parameters related to interferences to the non-transmission objects by executing the function of the object determining unit 201. Further, the controller 821 or the controller 851 may allocate at least part of pilot sequences in a cell center pilot group to the cell center communication devices, and allocate at least part of pilot sequences in a cell edge pilot group to the cell edge communication devices by executing the functions of the classifying unit 401 and the allocating unit 402. The controller 821 or the controller 851 may determine, based on the parameters related to interferences to the non-transmission objects, a range of non-transmission objects to which the interferences are to be considered, by executing the function of the range determining unit 502.

<Sixth Embodiment>

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the electronic device can also be used in the methods.

Figure 19:
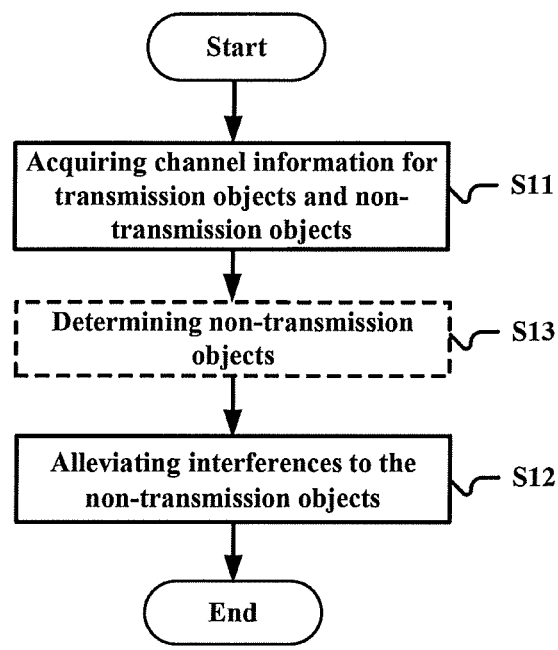
FIG. 19 is a flow chart illustrating a method for wireless communications according to an embodiment of the present disclosure.

FIG. 19 illustrates a flow chart of a method for wireless communications according to an embodiment of the present disclosure. The method includes the following steps: acquiring channel information for transmission objects and non-transmission objects of wireless communications (S11), where transmission by the transmission objects is controlled by a given apparatus and transmission by the non-transmission objects is not controlled by the given apparatus; and alleviating, based on the channel information for the transmission objects and the non-transmission objects, interferences to the non-transmission objects (S12).

The method may be executed by a given apparatus functioning as a base station device, the transmission objects are user equipments in the cell served by the given apparatus, and the non-transmission objects are user equipments in cells served by other base station devices.

In an example, in step S11, pilot signals transmitted by the transmission objects and the non-transmission objects are received, and channel estimation is performed based on the pilot signals to acquire channel information, wherein pilot sequences carried by the pilot signals transmitted by the transmission objects are orthogonal to pilot sequences carried by the pilot signals transmitted by the non-transmission objects.

Specifically, in step S11, pilots which are possible to be transmitted by the non-transmission objects may be determined based on an ID of a controlling node for the non-transmission objects, where each controlling node corresponds to a particular set of available pilots.

In step S11, it is also possible to perform channel estimation based on pilot related information of the non-transmission objects, which is acquired from a central controlling device in a wireless communication network or a controlling node for the non-transmission objects in advance, to obtain the channel information for the non-transmission objects.

In step S12, a pre-coding matrix for the transmission objects can be calculated based on the channel information for the transmission objects and the non-transmission objects.

Figure 20:
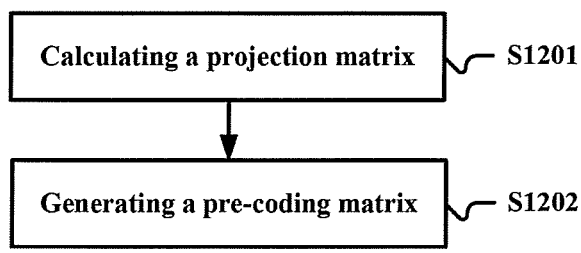
FIG. 20 is a flow chart illustrating sub-steps of step S12 of the method shown in FIG. 19.

As an example, as shown in FIG. 20, the step S12 may include the following sub-steps: acquiring, based on the channel information for the non-transmission objects, a channel coefficient matrix for the non-transmission objects, and calculating a projection matrix of the channel coefficient matrix on a null space of a space formed by column vectors of the channel coefficient matrix (S1201); and generating, based on the channel information for the transmission objects and the projection matrix, the pre-coding matrix for the transmission objects (S1202).

In step S1202, it is possible to generate, based on the channel information for the transmission objects and the projection matrix, equivalent channel coefficients which do not incur interferences to the non-transmission objects, and generate the pre-coding matrix for the transmission objects by using the equivalent channel coefficients.

Further, as another example, in step S12, it is possible to acquire, based on the channel information for the transmission objects and the non-transmission objects, a pre-coding matrix of each of the transmission objects by maximizing signal power of the transmission object while maintaining the interferences to the non-transmission objects lower than a predetermined threshold, so as to acquire the pre-coding matrix of the transmission objects. In this example, the acquisition of the pre-coding matrix is performed as an optimization problem.

Referring back to FIG. 19, as shown in the dotted block, the method may further include in the following step: determining the non-transmission objects according to parameters related to interferences to the non-transmission objects (S13), where the related parameters include at least one of geographical locations of the non-transmission objects and signal reception situations of the non-transmission objects. In addition, the non-transmission objects determined in step S13 are taken as the non-transmission objects to which interferences are to be alleviated in step S12.

Specifically, in step S13, the non-transmission objects of which geographical locations are within a predetermined range may be determined as the non-transmission objects to be considered. Alternatively, in step S13, non-transmission objects from which signals of intensities higher than a predefined threshold are received may be determined as the non-transmission objects to be considered. Further, the non-transmission objects may be determined by means of cooperation between base stations. Please refer to the second embodiment and the fifth embodiment for the detailed description, which is not repeatedly described here.

In the above method, by considering the channel information for both the transmission objects and the non-transmission objects, inferences to the non-transmission objects can be significantly reduced, thereby improving the system performance.

Figure 21:
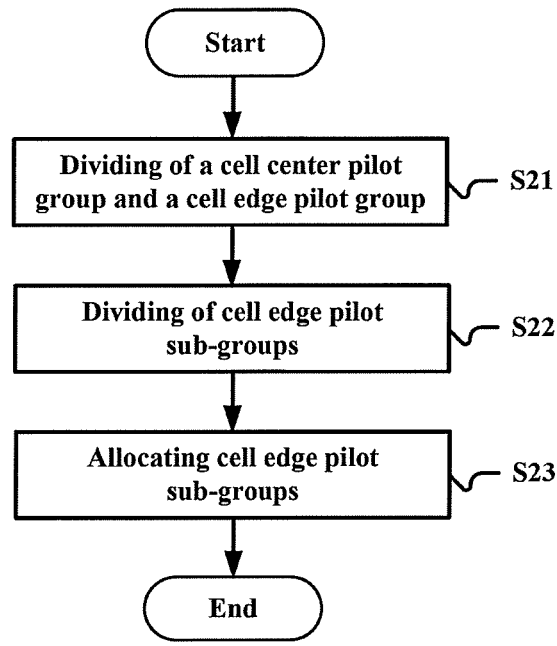
FIG. 21 is a flow chart illustrating a method for use in a wireless communication system according to an embodiment of the disclosure.

FIG. 21 illustrates a method for use in a wireless communication system according to an embodiment of the disclosure. The method includes the following steps: dividing pilot sequences for wireless communications into a cell center pilot group to be used for communication devices in a center of a cell and a cell edge pilot group to be used for communication devices in an edge of the cell (S21); dividing the cell edge pilot group into a plurality of cell edge pilot sub-groups which do not overlap with each other (S22); and allocating different cell edge pilot sub-groups to neighboring cells (S23), wherein pilot sequences contained in the cell center pilot group are multiplexed by neighboring cells.

The method may be applied in, for example, a central controlling node for allocating the pilot sequences.

In an example, in step S23, information containing a plurality of cell IDs and cell edge pilot sub-groups respectively corresponding to the plurality of cell IDs is transmitted to each cell. Alternatively or as a supplement, identifiers of the cell edge pilot sub-groups and pilot sequences contained in the edge cell pilot sub-groups may be transmitted to each cell. The latter manner can support dynamic grouping, and the grouping is informed to each cell when updated.

In this method, by dividing the available pilot sequences into the cell center pilot group and the cell edge pilot sub-groups, and allocating different cell edge pilot sub-groups to neighboring cells and multiplexing the cell center pilot group among neighboring cells, it is possible to reduce the interference while enhancing pilot multiplexing efficiency.

Figure 22:
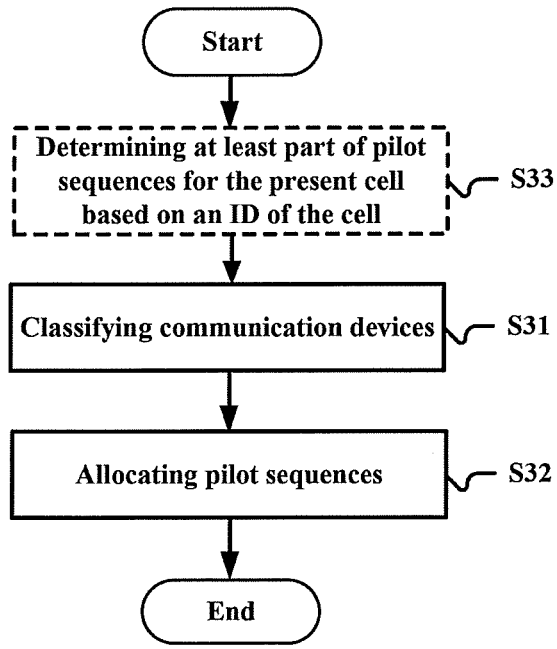
FIG. 22 is a flow chart illustrating a method for wireless communications according to an embodiment of the disclosure.

FIG. 22 illustrates a method for wireless communications according to an embodiment of the disclosure. The method includes: classifying communication devices in a cell into cell center communication devices and cell edge communication devices (S31); and allocating at least part of pilot sequences in a cell center pilot group to the cell center communication devices, and allocating at least part of pilot sequences in a cell edge pilot group to the cell edge communication devices, wherein the cell and neighboring cells multiplex the cell center pilot group, and the cell and the neighboring cells do not multiplex the at least part of pilot sequences in the cell edge pilot group.

In step S31, classification may be performed based on channel measurement results or location information of the communication devices. As an example, in step S31, a pilot signal may be received from a communication device, signal power of the communication device may be detected by using the pilot signal, and the communication device may be classified as the cell center communication device in the case that the signal power is higher than a certain threshold, and the communication device may be classified as the cell edge communication device in other cases.

It is to be noted that, the method may be performed in conjunction with the method as shown in FIG. 21. That is, the cell center pilot group and the cell edge pilot sub-groups may be allocated according to the method as shown in FIG. 21.

As an example, as shown in the dotted block in FIG. 22, the method may further include the following step: determining, based on an ID of a cell, at least part of pilot sequences in the cell edge pilot group which are used for the cell (S33), wherein the cell edge pilot group is divided into a plurality of cell edge pilot sub-groups, and the at least part of pilot sequences are contained in a particular cell edge pilot sub-group.

In this method, communication devices are classified into cell center communication devices and cell edge communication devices, such that cell edge communication devices in neighboring cells use different pilot sequences and cell center communication devices in neighboring cells multiplex the cell center pilot group, thereby reducing interferences to communication devices in neighboring cells while enhancing pilot multiplexing efficiency.

Figure 23:
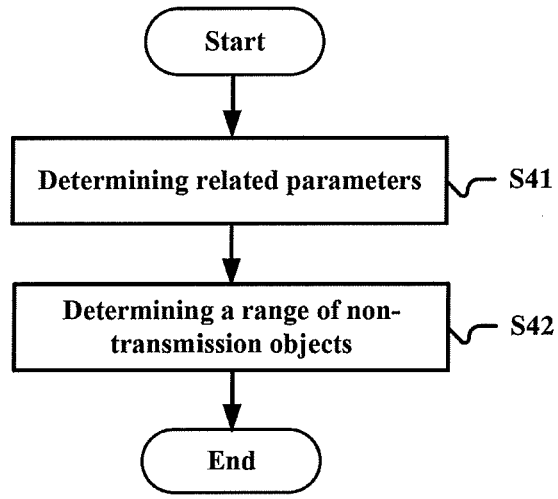
FIG. 23 is a flow chart illustrating a method for wireless communications according to an embodiment of the disclosure.

FIG. 23 illustrates a method for wireless communications according to an embodiment of the disclosure. The method includes: determining parameters related to interferences to non-transmission objects (S41); and determining, based on the parameters, a range of non-transmission objects to which the interferences are to be considered (S42), wherein transmission by transmission objects of a given apparatus is controlled by the given apparatus and transmission by the non-transmission objects is not controlled by the given apparatus.

As an example, in step S41, geographical locations of the non-transmission objects may be taken as the parameters, and in step S42, the non-transmission objects of which the geographical locations are within a predetermined range may be determined as the non-transmission objects to be considered.

Further, in step S41, intensities of signals received from the non-transmission objects may also be taken as the parameters, and in step S42, the non-transmission objects from which a signal of the intensity higher than a predefined threshold is received may be determined as the non-transmission objects to be considered.

In addition, in step S41, geographical locations and channel quality information of the non-transmission objects may be taken as the parameters, and in step S42, the non-transmission objects of which the channel quality is lower than a certain degree and of which the geographical locations are within a predetermined range can be determined as the non-transmission objects to be considered.

As an example, the above method may be executed by a base station device serving as the given apparatus, the transmission objects are user equipments in the cell served by the given apparatus, and the non-transmission objects are user equipments in cells served by other base station devices. The geographical locations and channel quality information of user equipments in each cell are shared among base station devices of cells.

It is to be noted that, the above methods can be used separately or in conjunction with each other. The details have been described in detail in the first to fifth embodiments, and are not repeatedly described here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, in the apparatus described above, the interference alleviating unit, the object determining unit, the first grouping unit, the second grouping unit, the pilot sub-group allocating unit, the classifying unit, the allocating unit, the interference parameter determining unit, the range determining unit and the like can be implemented by one or more processors, and the information acquiring unit and the like can be implemented by circuit elements such as an antenna, a filter, a modem, a codec and the like.

Therefore, an electronic device (1) is further provided in the present disclosure, which includes a circuit or at least one processor, configured to: acquire channel information for transmission objects and non-transmission objects of wireless communications, where transmission by the transmission objects is controlled by a given apparatus and transmission by the non-transmission objects is not controlled by the given apparatus; and alleviate, based on the channel information for the transmission objects and the non-transmission objects, interferences to the non-transmission objects.

An electronic device (2) is further provided in the present disclosure, which includes a circuit or at least one processor, configured to: divide pilot sequences for wireless communications into a cell center pilot group to be used for communication devices in a center of a cell and a cell edge pilot group to be used for communication devices in an edge of the cell; divide the cell edge pilot group into a plurality of cell edge pilot sub-groups which do not overlap with each other; and allocate different cell edge pilot sub-groups to neighboring cells, where pilot sequences in the cell center pilot group are multiplexed by neighboring cells.

An electronic device (3) is further provided in the present disclosure, which includes a circuit or at least one processor, configured to: classify communication devices in a cell into cell center communication devices and cell edge communication devices; allocate at least part of pilot sequences in a cell center pilot group to the cell center communication devices, and allocate at least part of pilot sequences in a cell edge pilot group to the cell edge communication devices, where the apparatus and neighboring cells multiplex the cell center pilot group, and the apparatus and the neighboring cells do not multiplex the at least part of pilot sequences in the cell edge pilot group.

An electronic device (4) is further provided in the present disclosure, which includes a circuit or at least one processor, configured to: determine parameters related to interferences to non-transmission objects; and determine, based on the parameters, a range of non-transmission objects to which the interferences are to be considered, where transmission by transmission objects of a given apparatus is controlled by the given apparatus and transmission by the non-transmission objects is not controlled by the given apparatus.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2400 shown in FIG. 24) from a storage medium or network, wherein the computer is capable of implementing various functions when installed with various programs.

Figure 24:
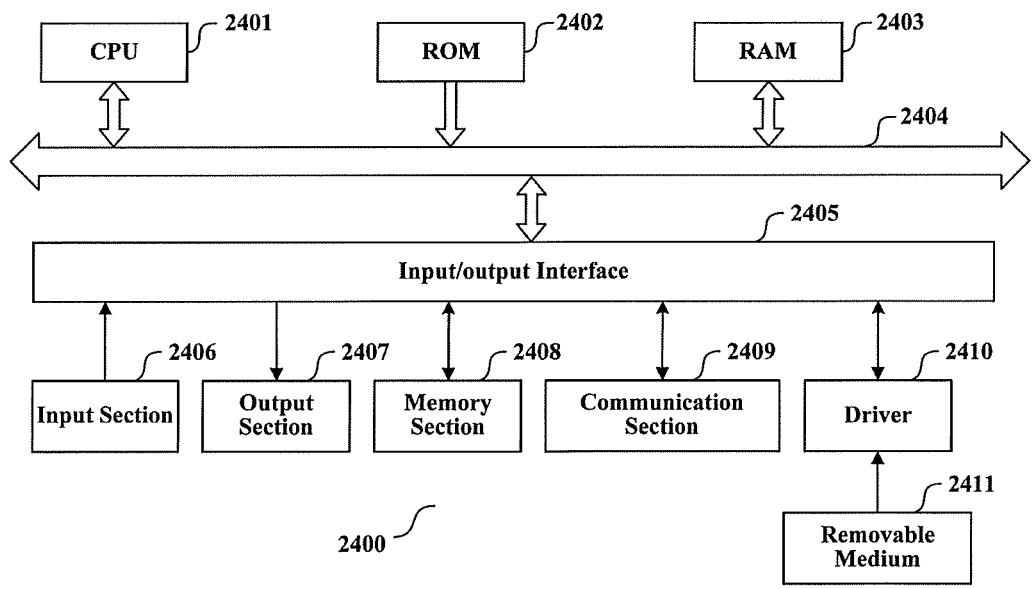
FIG. 24 is an exemplary block diagram illustrating the structure of a general purpose personal computer capable of realizing the method and/or device and/or system according to the embodiments of the present invention.

In FIG. 24, a central processing unit (CPU) 2401 executes various processing according to a program stored in a read-only memory (ROM) 2402 or a program loaded to a random access memory (RAM) 2403 from a memory section 2408. The data needed for the various processing of the CPU 2401 may be stored in the RAM 2403 as needed. The CPU 2401, the ROM 2402 and the RAM 2403 are linked with each other via a bus 2404. An input/output interface 2405 is also linked to the bus 2404.

The following components are linked to the input/output interface 2405: an input section 2406 (including keyboard, mouse and the like), an output section 2407 (including displays such as a cathode ray tube (CRT), a liquid crystal display (LCD), a loudspeaker and the like), a memory section 2408 (including hard disc and the like), and a communication section 2409 (including a network interface card such as a LAN card, modem and the like). The communication section 2409 performs communication processing via a network such as the Internet. A driver 2410 may also be linked to the input/output interface 2405. If needed, a removable medium 2411, for example, a magnetic disc, an optical disc, a magnetic optical disc, a semiconductor memory and the like, may be installed in the driver 2410, so that the computer program read therefrom is installed in the memory section 2408 as appropriate.

In the case where the foregoing series of processing is achieved by software, programs forming the software are installed from a network such as the Internet or a memory medium such as the removable medium 2411.

It should be appreciated by those skilled in the art that the memory medium is not limited to the removable medium 2411 shown in Figure, which has program stored therein and is distributed separately from the apparatus so as to provide the programs to users. The removable medium 2411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2402 and the memory section 2408 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
   circuitry, configured to:
      acquire channel information for transmission object user equipment in a first cell of the apparatus and channel information for non-transmission object user equipment in a second cell that is different from the first cell, wherein transmission by the transmission object user equipment is controlled by the apparatus and transmission by the non-transmission object user equipment is not controlled by the apparatus; and
      determine, based on the channel information for the transmission object user equipment in the first cell and the channel information for the non-transmission object user equipment in the second cell, a pre-coding matrix for the transmission object user equipment in the first cell to alleviate interference to the non-transmission object user equipment in the second cell, wherein
   the circuitry is further configured to determine the non-transmission object user equipment according to parameters related to the interference to the non-transmission object user equipment, and
      the related parameters comprise at least one of geographical locations of the non-transmission object user equipment and signal reception situations of the non-transmission object user equipment, and take the determined non-transmission object user equipment as the non-transmission object user equipment to which the interference is considered to be alleviated.

2. The apparatus according to claim 1, wherein the circuitry is further configured to:
   acquire, based on the channel information for the non-transmission object user equipment, a channel coefficient matrix for the non-transmission object user equipment, and calculate a projection matrix of the channel coefficient matrix on a null space of a space formed by column vectors of the channel coefficient matrix: and generate, based on the channel information for the transmission object user equipment and the projection matrix, the pre-coding matrix for the transmission object user equipment.

3. The apparatus according to claim 2, wherein the circuitry is configured to generate, based on the channel information for the transmission object user equipment and the projection matrix, equivalent channel coefficients which do not incur interference to the non-transmission object user equipment, and generate the pre-coding matrix for the transmission object user equipment by using the equivalent channel coefficients.

4. The apparatus according to claim 1, wherein
the circuitry is further configured to acquire, based on the channel information for the transmission object user equipment and the non-transmission object user equipment, a pre-coding matrix of each of the transmission object user equipment by maximizing signal power of the respective transmission object user equipment while maintaining the interference to the non-transmission object user equipment lower than a predetermined threshold.

5. The apparatus according to claim 1, wherein the circuitry is further configured to determine the non-transmission object user equipment of which the geographical locations are within a predetermined range as the non-transmission object user equipment to be considered.

6. The apparatus according to claim 1, wherein the circuitry is further configured to determine the non-transmission object user equipment from which signals of intensities higher than a predefined threshold are received as the non-transmission object user equipment to be considered.

7. The apparatus according to claim 1, wherein
the circuitry is further configured to receive pilot signals transmitted by the transmission object user equipment and pilot signals transmitted by the non-transmission object user equipment, and perform channel estimation based on the pilot signals to obtain the channel information, and pilot sequences carried by the pilot signals transmitted by the transmission object user equipment are orthogonal to pilot sequences carried by the pilot signals transmitted by the non-transmission object user equipment.

8. The apparatus according to claim 7, wherein
the circuitry is further configured to determine, based on an ID of a controlling node for the non-transmission object user equipment, pilots which are possible to be transmitted by the non-transmission object user equipment, and each controlling node corresponds to a particular set of available pilots.

9. The apparatus according to claim 8, wherein the circuitry is further configured to perform the channel estimation based on pilot related information of the non-transmission object user equipment, which is acquired from a central controlling device in a wireless communication network or a controlling node of the non-transmission object user equipment in advance, to obtain the channel information for the non-transmission object user equipment.

10. The apparatus according to claim 1, wherein the apparatus is a base station device, the transmission object user equipment is in the first cell served by the apparatus, and the non-transmission object user equipment is in the second cell served by another base station device.

11. A method for wireless communications, comprising:
acquiring channel information for transmission object user equipment in a first cell of an apparatus and channel information of non-transmission object user equipment in a second cell that is different from the first cell, wherein transmission by the transmission object user equipment controlled by the apparatus and transmission by the non-transmission object user equipment is not controlled by the apparatus;

determining, based on the channel information for the transmission object user equipment in the first cell and the channel information for the non-transmission object user equipment in the second cell, a pre-coding matrix for the transmission object user equipment in the first cell to alleviate interference to the non-transmission object user equipment in the second cell; and determining the non-transmission object user equipment according to parameters related to the interference to the non-transmission object user equipment, wherein the related parameters comprise at least one of geographical locations of the non-transmission object user equipment and signal reception situations of the non-transmission object user equipment, and take the determined non-transmission object user equipment as the non-transmission object user equipment to which the interference is considered to be alleviated.

12. A non-transitory computer readable storage medium including executable instructions, which when executed by a processor of an apparatus cause the apparatus to execute a method for wireless communication, the method comprising:

acquiring channel information for transmission object user equipment in a first cell of the apparatus and channel information of non-transmission object user equipment in a second cell that is different from the first cell, wherein transmission by the transmission object user equipment is controlled by the apparatus and transmission by the non-transmission object user equipment is not controlled by the apparatus;

determining, based on the channel information for the transmission object user equipment in the first cell and the channel information for the non-transmission object user equipment in the second cell, a pre-coding matrix for the transmission object user equipment in the first cell to alleviate interference to the non-transmission object user equipment in the second cell; and determining the non-transmission object user equipment according to parameters related to the interference to the non-transmission object user equipment, wherein the related parameters comprise at least one of geographical locations of the non-transmission object user equipment and signal reception situations of the non-transmission object user equipment, and take the determined non-transmission object user equipment as the non-transmission object user equipment to which the interference is considered to be alleviated.

13. A user equipment for wireless communications, comprising:
circuitry, configured to:
transmit a pilot signal to a base station of a first cell for the base station to acquire channel information for the user equipment in the first cell, and receive a downlink data signal pre-coded with a pre-coding matrix from the base station, wherein
the pre-coding matrix is determined by the base station, based on the channel information for the user equipment in the first cell and channel information for a non-transmission object user equipment in a second cell that is different from the first cell, to alleviate interference to the non-transmission object user equipment in the second cell, and transmission by the non-transmission object user equipment is not controlled by the base station, wherein the base station is configured to determine the non-transmission object user equipment according to parameters related to the interference to the non-transmission object user equipment, the related parameters including at least one of geographical locations of the non-transmission object user equipment and signal reception situations of the non-transmission object user equipment and take the determined non-transmission object user equipment as the non-transmission object user equipment to which interference is considered to be alleviated.

14. The user equipment according to claim 13, wherein the pre-coding matrix for the user equipment is determined by the base station based on the channel information for the user equipment and a projection matrix of a channel coefficient matrix for the non-transmission object user equipment, the channel coefficient matrix is acquired based on the channel information for the non-transmission object user equipment, and the projection matrix is calculated on a null space of a space formed by column vectors of the channel coefficient matrix.

15. The user equipment according to claim 14, wherein the pre-coding matrix is determined by the base station using equivalent channel coefficients which do not incur interference to the non-transmission object user equipment, and the equivalent channel coefficients are generated by the base station based on the channel information for the user equipment and the projection matrix.

16. The user equipment according to claim 13, wherein the base station is configured to acquire, based on the channel information for a plurality of the user equipment and the non-transmission object user equipment, a pre-coding matrix of each of the plurality of the user equipment by maximizing signal power of the respective user equipment while maintaining the interference to the non-transmission object user equipment lower than a predetermined threshold.

17. The user equipment according to claim 13, wherein the non-transmission object user equipment of which the geographical locations are within a predetermined range are determined as the non-transmission object user equipment to be considered.

18. The user equipment according to claim 13, wherein the non-transmission object user equipment from which signals of intensities higher than a predefined threshold are received are determined as the non-transmission object user equipment to be considered.

19. The user equipment according to claim 13, wherein the base station is configured to receive pilot signals transmitted by the user equipment and pilot signals transmitted by the non-transmission object user equipment, and perform channel estimation based on the pilot signals to obtain the channel information, and pilot sequences carried by the pilot signals transmitted by the user equipment are orthogonal to pilot sequences carried by the pilot signals transmitted by the non-transmission object user equipment.

20. The user equipment according to claim 19, wherein the base station is configured to determine, based on an ID of a controlling node for the non-transmission object user equipment, pilots which are possible to be transmitted by the non-transmission object user equipment, and each controlling node corresponds to a particular set of available pilots.

21. The user equipment according to claim 20, wherein the base station is configured to perform the channel estimation based on pilot related information of the non-transmission object user equipment, which is acquired from a central controlling device in a wireless communication network or a controlling node of the non-transmission object user equipment in advance, to obtain the channel information for the non-transmission object user equipment.

22. The user equipment according to claim 13, wherein the user equipment is in the first cell served by the base station, and the non-transmission object user equipment is in the second cell served by another base station.

* * * * *